(12) United States Patent
Koike et al.

(10) Patent No.: US 6,973,827 B2
(45) Date of Patent: Dec. 13, 2005

(54) FLOW RATE MEASURING METHOD AND FLOWMETER, FLOW RATE MEASURING SECTION PACKAGE USED FOR THEM AND FLOW RATE MEASURING UNIT USING THEM, AND PIPING LEAKAGE INSPECTION DEVICE USING FLOWMETER

(75) Inventors: Atsushi Koike, Ageo (JP); Toshiaki Kawanishi, Ageo (JP); Toshimi Nakamura, Ageo (JP); Takayuki Takahata, Ageo (JP); Kiyoshi Yamagishi, Ageo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 10/508,095

(22) PCT Filed: Mar. 18, 2003

(86) PCT No.: PCT/JP03/03251

§ 371 (c)(1),
(2), (4) Date: Sep. 15, 2004

(87) PCT Pub. No.: WO03/078934

PCT Pub. Date: Sep. 25, 2003

(65) Prior Publication Data

US 2005/0155421 A1      Jul. 21, 2005

(30) Foreign Application Priority Data

Mar. 20, 2002  (JP)  ............................. 2002-079180
Mar. 25, 2002  (JP)  ............................. 2002-083412
Apr. 8, 2002   (JP)  ............................. 2002-105336

(51) Int. Cl.$^7$ ............................................... G01F 1/68
(52) U.S. Cl. ..................................................... 73/204.17
(58) Field of Search .............................. 73/861, 204.11, 73/204.17

(56) References Cited

U.S. PATENT DOCUMENTS 5,936,156 A * 8/1999 Roberts et al. .......... 73/204.19
6,208,254 B1 * 3/2001 McQueen et al. ....... 73/204.17

FOREIGN PATENT DOCUMENTS

JP              62-18708 U      2/1987

* cited by examiner

*Primary Examiner*—Edward Lefkowitz
*Assistant Examiner*—Takisha Miller
(74) *Attorney, Agent, or Firm*—Frommer Lawrence & Haug LLP; Ronald R. Santucci

(57) ABSTRACT

Measurements are obtained by a computing unit based on an output Vh from an indirectly-heated constant-temperature controlling flow rate measuring section (16) and an output Vout from a two-constant-point temperature difference detecting flow rate measuring sections (18a, 18b). In the flow rate measuring section (16), a heating element (163) is feedback-controlled based on a detected temperature by a heat sensing element (162) to obtain an output Vh based on the feedback-controlled condition. An output Vout is obtained from flow rate measuring sections (18a, 18b) based on the detected temperature difference between a heat sensing element (182) disposed on the liquid-flow-direction upstream side of the flow rate measuring section (16) and a temperature sensing element disposed on the downstream side. A computing unit outputs as a measurement a flow rate obtained based on the output Vh in a flow rate region where a flow rate is larger than a predetermined boundary flow rate, and outputs as a measurement a flow rate obtained based on the output Vout in a flow rate region where it is less than a boundary flow rate. Accordingly, a flow rate is measured with good precision and sensitivity over a wide flow rate range from a trace-amount flow rate region to a comparatively large flow rate region.

12 Claims, 32 Drawing Sheets

FIG. 15
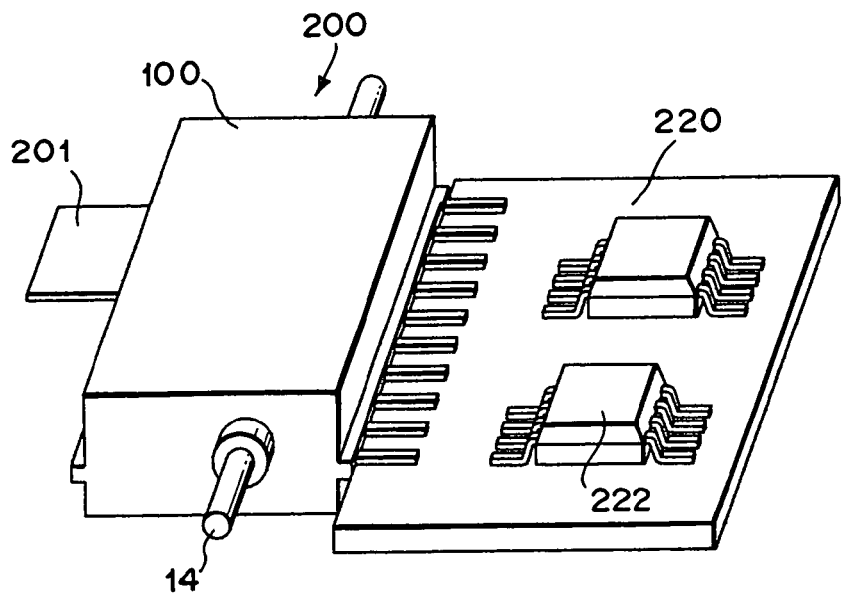
FIG. 16C
FIG. 16A
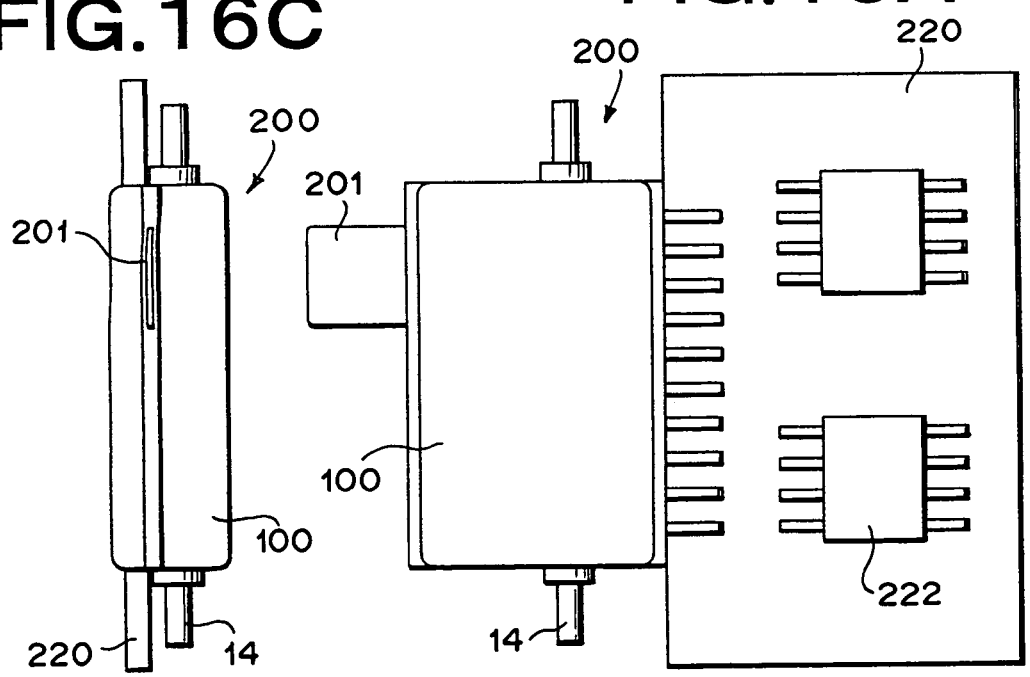
FIG. 16B
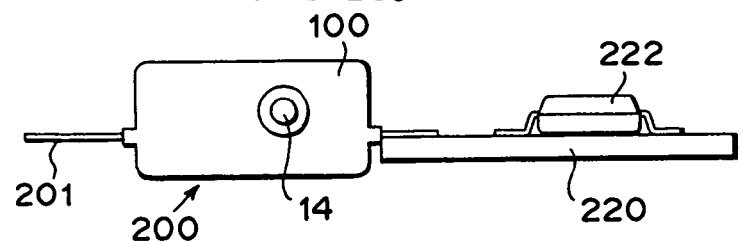

① SUPPLY LIQUID

② INSPECT (PRESSURIZE)

*WHEN THE DETECTED VALUE OF THE PRESSURE SENSOR EXCEEDS 20 kPa, THE THREE-WAY ELECTROMAGNETIC VALVE IS OPENED ON THE NC SIDE, AND THE LIQUID IS PREVENTED FROM FLOWING ON THE INSPECTION SEGMENT SIDE.

③ INSPECTION END (PRESSURE RELEASE)

④ DISCHARGE LIQUID

① SUPPLY LIQUID

② INSPECT (PRESSURIZE)

* WHEN THE PRESSURE ON THE SIDE OF THE INSPECTION SEGMENT EXCEEDS 20 kPa, THE CHECK VALVE OPENS.

③ INSPECTION END (PRESSURE RELEASE)

④ DISCHARGE LIQUID

① SUPPLY LIQUID

② INSPECT (PRESSURIZE)

* WHEN THE DETECTED VALUE OF THE PRESSURE SENSOR EXCEEDS 20 kPa, THE THREE-WAY ELECTROMAGNETIC VALVE ② IS OPENED ON THE NC SIDE TO PREVENT THE LIQUID FROM BEING PASSED ON THE SIDE OF THE INSPECTION SEGMENT.

③ INSPECTION END
(PRESSURE RELEASE)

④ DISCHARGE LIQUID

① SUPPLY LIQUID

② INSPECT (PRESSURIZE)

* WHEN THE PRESSURE ON THE INSPECTION SEGMENT SIDE EXCEEDS 20 kPa, THE CHECK VALVE OPENS.

③ INSPECTION END
(PRESSURE RELEASE)

④ DISCHARGE LIQUID

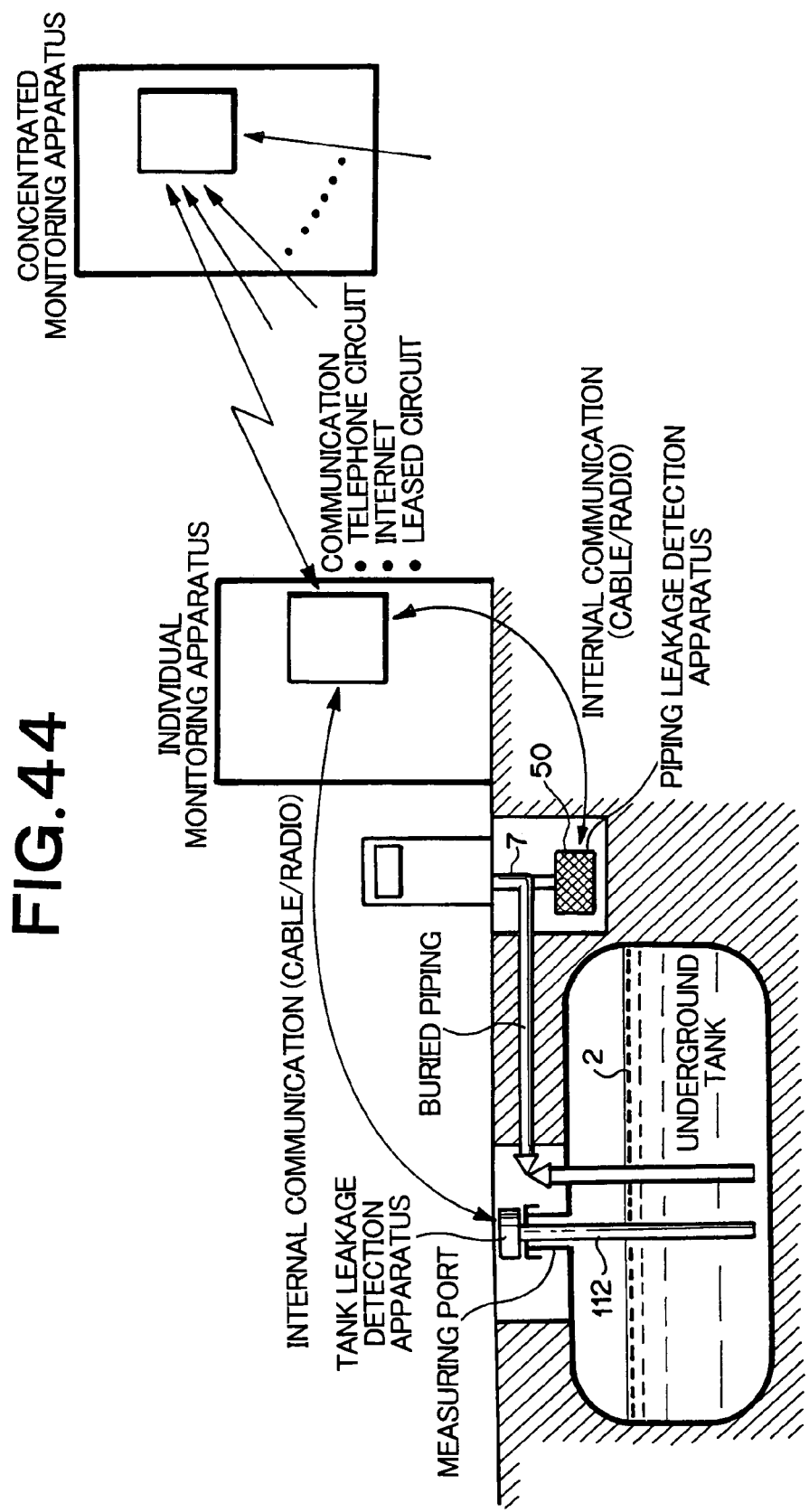

FLOW RATE MEASURING METHOD AND FLOWMETER, FLOW RATE MEASURING SECTION PACKAGE USED FOR THEM AND FLOW RATE MEASURING UNIT USING THEM, AND PIPING LEAKAGE INSPECTION DEVICE USING FLOWMETER

This application is a 371 of PCT/JP03/03251 filed on Mar. 18, 2003, published on Sep. 25, 2003 under publication number WO 03/078934 A1 which claims priority benefits from Japanese Patent Application Number 2002-79180 filed Mar. 20, 2002 and Japanese Patent Application Number 2002-83412 filed Mar. 25, 2002 and Japanese Patent Application Number 2002-105336 filed Apr. 8, 2002.

TECHNICAL FIELD

The present invention belongs to a fluid flow rate detection technique, and relates particularly to a method of measuring a flow rate of a fluid flowing through a fluid channel, and a flowmeter for use in the method. The present invention also relates particularly to a flow rate measuring section package for measuring a flow rate of a fluid flowing through a fluid channel, and a flow rate measuring unit using the package. Furthermore, the present invention relates to a device or apparatus which inspects a leakage of a liquid from a piping using a flowmeter. The leakage inspection apparatus of the present invention is preferably used, for example, in inspecting a liquid leakage in a piping which pumps out the liquid from a fuel oil tank such as a petroleum tank buried underground or a tank for various types of liquefied chemicals.

BACKGROUND ART

Various types of flow rate sensors (or flow velocity sensors) which measure flow rates (or flow velocities) of various types of fluids, especially liquids, have heretofore been used, and so-called heat type (especially indirectly-heated type) flow rate sensors have been used for a reason that prices are easily reduced.

As the indirectly-heated flow rate sensor, a sensor has been used in which a sensor chip obtained by stacking a thin-film heating element and a thin-film temperature detecting element via an insulating layer using a thin-film technique on a substrate is disposed in such a manner that heat can be transferred between the sensor chip and the fluid in a piping which is a fluid channel. When the heating element is energized, the temperature detecting element is heated, and values of electric properties such as electric resistances of the temperature detecting element are changed. The change of the electric resistance value (based on a temperature rise of the temperature detecting element) changes in accordance with the flow rate (flow velocity) of the fluid flowing in the piping. This is because a part of an amount of generated heat of the heating element is transferred into the fluid, the amount of the heat diffusing in the fluid changes in accordance with the flow rate (flow velocity) of the fluid, the amount of heat supplied into the temperature detecting element accordingly changes, and the electric resistance value of the temperature detecting element changes. The change of the electric resistance value of the temperature detecting element differs also at a temperature of the fluid. Therefore, a temperature detector for temperature compensation is incorporated in an electric circuit which measures the change of the electric resistance value of the temperature detecting element, and changes of flow rate measurement by the temperature of the fluid are reduced as much as possible.

This type of indirectly-heated flow rate sensor using the thin-film elements is described, for example, in JP(A)-11-118566. In the flow rate sensor, an electric circuit including a bridge circuit is used in order to obtain an electric output corresponding to the flow rate of the fluid.

Additionally, in recent years, importance of detection of leakage of the fluids from tanks or piping systems has increased. For example, when the oil leakages are generated from tanks of fuel oils such as gasoline, light oil, and kerosene, and a large amount of oil continuously leaks, problems such as fire breakout, environmental pollution, and resource loss are caused, and it is therefore extremely preferable to detect oil leakage generation in an initial stage. Therefore, oil leakage detection is sometimes required, for example, by a trace amount of 1 milliliter/h or less.

It is considered that the above-described indirectly-heated flow rate sensor is used in the detection of the oil leakage. However, in the flow rate sensor, the change of the output of the electric circuit with respect to a flow rate change is reduced in a region in which a flow rate value is a trace amount of 1 milliliter/h or less, there is a problem that an error of the flow rate measurement increases (i.e., a ratio of a distinguishable flow rate difference increases during measurement, and measurement sensitivity drops).

On the other hand, as the flow rate sensor, there is a two-constant-point temperature difference detecting system in which a fluid is heated by a heat source disposed in a specific position of a piping, temperature detecting elements are disposed at appropriate distances on upstream and downstream sides of a heat source position concerning fluid circulation in the piping, and a fluid flow rate is measured based on a detected temperature difference between upstream and downstream temperature detecting elements generated during the circulation of the fluid in the piping. However, in a case where the sensor is used in the detection of the oil leakage, when the flow rate value is, for example, 3 milliliters/h or more, the change of the output of the electric circuit with respect to the flow rate change is small, and therefore there is a problem that the error increases in a large flow rate value region (i.e., the ratio of the distinguishable flow rate difference increases during the measurement, and the measurement sensitivity drops).

Furthermore, the fuel oil tanks in a gas station and the like have heretofore been buried underground in most cases, and the piping which pumps out the fuel oil from the underground tank has also been buried underground. Micro cracks are generated in the piping by time degradation before long, and there is a very strong possibility that oil leakage is generated from the cracks. In this situation, surrounding environment pollution is caused, and enormous expenses are required for recovery. Therefore, the underground burial piping connected to the underground tank is periodically inspected for presence of oil leakage (or the crack in the piping, which is a cause for the leakage).

As a method which has heretofore been used for this piping inspection, there has been a method in which a gas such as air or a liquid such as water is pressurized/injected into the piping in a sealed state of the piping, and the presence of a pressure drop after elapse of a predetermined time is detected. Conversely, there has also been a method in which the tank is decompressed in a sealed state in the piping, and the presence of pressure increase after the elapse of the predetermined time is detected. However, in these methods, an operation for sealing all openings in the piping with putty or the like is required prior to the leakage inspection operation, an operation for extracting all the oil in the piping is required, and the operations are very troublesome. Additionally, when the openings are not completely sealed, the leakage detected in these methods does not necessarily reflect actual oil leakage based on the cracks in the piping, and it cannot be said that precision is high for labors of the inspection operation.

To quickly cope with the leakage of the liquid in the piping, it is essential that the leakage can be detected at an early stage at which the cracks in the piping and the like are small and the leakage is little, and therefore there has been a demand for the detection of a small amount of leakage.

DISCLOSURE OF THE INVENTION

Therefore, an object of the present invention is to provide a method of measuring a flow rate and a flowmeter in which the flow rate can be measured with satisfactory precision and sensitivity over a broad flow rate range from a trace flow rate region to a comparatively large flow rate region.

In order to attain the above object, according to the present invention, there is provided a method of measuring a flow rate of a fluid in a fluid flow channel, comprising the steps of: obtaining a flow rate value obtained by measuring a flow rate of the fluid by indirectly-heated constant-temperature controlling flow rate measuring as a measurement with respect to a high flow rate region larger than a boundary flow rate region predetermined concerning a value of the flow rate; obtaining a flow rate value obtained by two-constant-point temperature difference detecting flow rate measuring as a measurement with respect to a low flow rate region smaller than the boundary flow rate region; obtaining a flow rate value obtained by the indirectly-heated constant-temperature controlling flow rate measuring or a flow rate value obtained by the two-constant-point temperature difference detecting flow rate measuring as a measurement with respect to the boundary flow rate region; and using a measuring section for the indirectly-heated constant-temperature controlling flow rate measuring as a heat source which heats the fluid in the fluid flow channel in the two-constant-point temperature difference detecting flow rate measuring.

In an aspect of the present invention, the boundary flow rate region is constituted of one specific flow rate value only. In an aspect of the present invention, the method further comprises the steps of: first measuring the flow rate of the fluid by the indirectly-heated constant-temperature controlling flow rate measuring; obtaining the flow rate value as the measurement, when the obtained flow rate value belongs to the high flow rate region or one of the high flow rate region and the boundary flow rate region; in another case, next measuring the flow rate of the fluid by the two-constant-point temperature difference detecting flow rate measuring; and obtaining the obtained flow rate value as the measurement. In an aspect of the present invention, the method further comprises the steps of: first measuring the flow rate of the fluid by the two-constant-point temperature difference detecting flow rate measuring; obtaining the flow rate value as the measurement, when the obtained flow rate value belongs to the low flow rate region or one of the low flow rate region and the boundary flow rate region; in another case, next measuring the flow rate of the fluid by the indirectly-heated constant-temperature controlling flow rate measuring; and obtaining the obtained flow rate value as the measurement.

In order to attain the above object, according to the present invention, there is also provided a flowmeter which measures a flow rate of a fluid in a fluid flow channel, comprising:

an indirectly-heated constant-temperature controlling flow rate measuring section and a two-constant-point temperature difference detecting flow rate measuring section disposed facing the fluid flow channel; and a computing section which obtains a measurement based on a first flow rate corresponding output obtained using the indirectly-heated constant-temperature controlling flow rate measuring section and a second flow rate corresponding output obtained using the two-constant-point temperature difference detecting flow rate measuring section, wherein the indirectly-heated constant-temperature controlling flow rate measuring section has a heating element and a first temperature detecting element disposed adjacent to the heating element, the heating element is feedback-controlled based on a detected temperature of the first temperature detecting element, and the first flow rate corresponding output is obtained based on a state of the feedback control, the two-constant-point temperature difference detecting flow rate measuring section has a second temperature detecting element and a third temperature detecting element disposed on upstream and downstream sides, respectively, of the indirectly-heated constant-temperature controlling flow rate measuring section with respect to a fluid flowing direction in the fluid flow channel, and a second flow rate corresponding output is obtained based on a difference between detected temperatures of the second and third temperature detecting elements, and the computing section outputs a flow rate value obtained based on the first flow rate corresponding output as a measurement with respect to a high flow rate region larger than a boundary flow rate region predetermined concerning the value of the flow rate, outputs a flow rate value obtained based on the second flow rate corresponding output as a measurement with respect to a low flow rate region smaller than the boundary flow rate region, and outputs a flow rate value obtained based on the first or second flow rate corresponding output as a measurement with respect to the boundary flow rate region.

In an aspect of the present invention, the boundary flow rate region is constituted of one specific flow rate value only. In an aspect of the present invention, the computing section first outputs the flow rate value obtained based on the first flow rate corresponding output as the measurement, when the first flow rate corresponding output corresponds to the high flow rate region or one of the high flow rate region and the boundary flow rate region, and, in another case, outputs the flow rate value obtained based on the second flow rate corresponding output as the measurement. In an aspect of the present invention, the computing section first outputs the flow rate value obtained based on the second flow rate corresponding output as the measurement, when the second flow rate corresponding output corresponds to the low flow rate region or one of the low flow rate region and the boundary flow rate region, and, in another case, outputs the flow rate value obtained based on the first flow rate corresponding output as the measurement.

In an aspect of the present invention, both the heating element and the first temperature detecting element have energizeable thin film shapes, and are stacked via an electrically insulating thin film. In an aspect of the present invention, the first flow rate corresponding output is obtained from a detection circuit including the heating element, the first temperature detecting element, and a temperature detecting element for temperature compensation.

Another object of the present invention is to provide a flow rate measuring section package and a flow rate measuring unit using the same for measuring a flow rate in which the flow rate can be measured with satisfactory precision and sensitivity over a broad flow rate range from a trace flow rate region to a comparatively large flow rate region.

In order to attain the above object, according to the present invention, there is provided a flow rate measuring section package for measuring a flow rate of a fluid in a fluid flow channel, comprising:

an indirectly-heated constant-temperature controlling flow rate measuring section and a two-constant-point temperature difference detecting flow rate measuring section which are attached to the fluid flow channel, the two-constant-point temperature difference detecting flow rate measuring section comprising an upstream-side temperature detecting section and a downstream-side temperature detecting section disposed on upstream and downstream sides, respectively, of the indirectly-heated constant-temperature controlling flow rate measuring section with respect to a fluid flowing direction in the fluid flow channel;

wherein the indirectly-heated constant-temperature controlling flow rate measuring section has a heating element and a first temperature detecting element disposed adjacent to the heating element, the upstream-side temperature detecting section has a second temperature detecting element, and the downstream-side temperature detecting section has a third temperature detecting element, and the indirectly-heated constant-temperature controlling flow rate measuring section is connected to a first wiring section for electric connection to the heating element and the first temperature detecting element, the upstream-side temperature detecting section is connected to a second wiring section for electric connection to the second temperature detecting element, and the downstream-side temperature detecting section is connected to a third wiring section for electric connection to the third temperature detecting element.

In an aspect of the present invention, one of the first, second, and third wiring sections are all formed using flexible wiring substrates. In an aspect of the present invention, the indirectly-heated constant-temperature controlling flow rate measuring section, the upstream-side temperature detecting section, the downstream-side temperature detecting section, and a part of the fluid flow channel to which these sections are attached are housed in a casing. In an aspect of the present invention, first, second, and third terminals constituting the first, second, and third wiring sections, respectively, are extended from the casing.

In an aspect of the present invention, a temperature detecting section having a temperature detecting element for temperature compensation is accommodated in the casing, the temperature detecting section is connected to a heat transfer member extending out of the casing, and a fourth terminal constituting a fourth wiring for electric connection to the temperature detecting element for temperature compensation is extended from the casing. In an aspect of the present invention, both the heating element and the first temperature detecting element have energizeable thin film shapes, and are stacked via an electrically insulating thin film.

In order to attain the above object, according to the present invention, there is also provided a flow rate measuring unit, comprising: the above-mentioned flow rate measuring section package; a unit substrate for attaching the flow rate measuring section package; and a flow rate measuring circuit element attached to the unit substrate.

In an aspect of the present invention, the flow rate measuring circuit element includes an analog circuit element, which feedback-controls the heating element based on a detected temperature of the first temperature detecting element, obtains a first flow rate corresponding output based on a state of the feedback control, and obtains a second flow rate corresponding output based on a difference between detected temperatures of the second and third temperature detecting elements.

In an aspect of the present invention, the flow rate measuring circuit element further includes a digital circuit element, which comprises a computing section which obtains a flow rate measurement based on the first and second flow rate corresponding outputs, and the computing section outputs a flow rate value obtained based on the first flow rate corresponding output as the measurement with respect to a high flow rate region larger than a boundary flow rate region predetermined concerning the value of the flow rate, outputs a flow rate value obtained based on the second flow rate corresponding output as the measurement with respect to a low flow rate region smaller than the boundary flow rate region, and outputs a flow rate value obtained based on the first or second flow rate corresponding output as the measurement with respect to the boundary flow rate region.

In an aspect of the present invention, the boundary flow rate region is constituted of one specific flow rate value only. In an aspect of the present invention, the computing section first outputs the flow rate value obtained based on the first flow rate corresponding output as the measurement, when the first flow rate corresponding output corresponds to the high flow rate region or one of the high flow rate region and the boundary flow rate region, and, in another case, outputs the flow rate value obtained based on the second flow rate corresponding output as the measurement, or, first outputs the flow rate value obtained based on the second flow rate corresponding output as the measurement, when the second flow rate corresponding output corresponds to the low flow rate region or one of the low flow rate region and the boundary flow rate region, and, in another case, outputs the flow rate value obtained based on the first flow rate corresponding output as the measurement.

Still another object of the present invention is to provide a piping leakage inspection apparatus or device capable of easily and correctly detecting even a trace amount of leakage. Furthermore object of the present invention is to provide a leakage inspection apparatus or device capable of performing leakage inspection utilizing a liquid which has been transferred into a piping and which is left in the piping.

In order to attain the above object, according to the present invention, there is provided a piping leakage inspection apparatus which inspects a leakage of a liquid from a piping to be measured, comprising:

an internal piping system comprising a connection end for communication with the piping to be measured, and a liquid discharge end; a tank for temporarily storing a pressurized liquid, which is connected to the internal piping system; and a pump and a flowmeter disposed in order in a path extending to the connection end from the tank for temporarily storing the pressurized liquid in the internal piping system, wherein the internal piping system is capable of forming a first path which transfers the liquid into the tank for temporarily storing the pressurized liquid from the piping to be measured through the connection end by the pump without passing the liquid through the flowmeter, a second path for pressure-feeding the liquid into the piping to be measured from the tank for temporarily storing the pressurized liquid through the flowmeter and the connection end by the pump, and a third path for transferring the liquid into the liquid discharge end from the tank for temporarily storing the pressurized liquid by the pump, and the leakage of the liquid from the piping to be measured is inspected based on a liquid flow rate detected by the flowmeter at a time when a liquid pressure of a part of the second path extending to the connection end from the pump is raised by the liquid pressure-feeding by the pump in a state in which the connection end is connected to the piping to be measured.

In an aspect of the present invention, the internal piping system is capable of forming a fourth path which returns the liquid into the tank for temporarily storing the pressurized liquid from a part between the pump and the flowmeter in a case where the liquid pressure of the part extending to the connection end from the pump exceeds a set value in the second path. In an aspect of the present invention, the internal piping system is further capable of forming a fifth path for releasing the liquid pressure of at least a part of the part extending to the connection end from the flowmeter in the second path.

In an aspect of the present invention, the flowmeter comprises: an indirectly-heated constant-temperature controlling flow rate measuring section and a two-constant-point temperature difference detecting flow rate measuring section disposed facing a fluid flow channel constituting the internal piping system; and a computing section which obtains a measurement based on a first flow rate corresponding output obtained using the indirectly-heated constant-temperature controlling flow rate measuring section and a second flow rate corresponding output obtained using the two-constant-point temperature difference detecting flow rate measuring section, the indirectly-heated constant-temperature controlling flow rate measuring section has a heating element and a first temperature detecting element disposed adjacent to the heating element, the heating element is feedback-controlled based on a detected temperature of the first temperature detecting element, and the first flow rate corresponding output is obtained based on a state of the feedback control, the two-constant-point temperature difference detecting flow rate measuring section has a second temperature detecting element and a third temperature detecting element disposed on upstream and downstream sides, respectively, of the indirectly-heated constant-temperature controlling flow rate measuring section with respect to a fluid flowing direction in the fluid flow channel, and the second flow rate corresponding output is obtained based on a difference between detected temperatures of the second and third temperature detecting elements, and the computing section outputs a flow rate value obtained based on the first flow rate corresponding output as a measurement with respect to a high flow rate region larger than a boundary flow rate region predetermined concerning the value of the flow rate, outputs a flow rate value obtained based on the second flow rate corresponding output as a measurement with respect to a low flow rate region smaller than the boundary flow rate region, and outputs a flow rate value obtained based on the first or second flow rate corresponding output as a measurement with respect to the boundary flow rate region.

In an aspect of the present invention, the boundary flow rate region is constituted of one specific flow rate value only.

In an aspect of the present invention, the computing section first outputs the flow rate value obtained based on the first flow rate corresponding output as the measurement, when the first flow rate corresponding output corresponds to the high flow rate region or one of the high flow rate region and the boundary flow rate region, and, in another case, outputs the flow rate value obtained based on the second flow rate corresponding output as the measurement. In an aspect of the present invention, the computing section first outputs the flow rate value obtained based on the second flow rate corresponding output as the measurement, when the second flow rate corresponding output corresponds to the low flow rate region or one of the low flow rate region and the boundary flow rate region, and, in another case, outputs the flow rate value obtained based on the first flow rate corresponding output as the measurement.

In an aspect of the present invention, both the heating element and the first temperature detecting element have energizeable thin film shapes, and are stacked via an electrically insulating thin film. In an aspect of the present invention, the first flow rate corresponding output is obtained from a detection circuit including the heating element, the first temperature detecting element, and a temperature detecting element for temperature compensation.

BRIEF DESCRIPTION OF THE DRAWINGS

FIG. 15 is a perspective view showing an embodiment of a flow rate measuring unit according to the present invention;

FIG. 16A is a plan view of the flow rate measuring unit of FIG. 15;

FIG. 16B is a front view of the flow rate measuring unit of FIG. 15;

FIG. 16C is a side view of the flow rate measuring unit of FIG. 15;

FIG. 44 is a schematic diagram showing one embodiment of a liquid leakage monitoring system in which the piping leakage inspection apparatus according to the present invention is used.

BEST MODE FOR CARRYING OUT THE INVENTION

Figure 1:
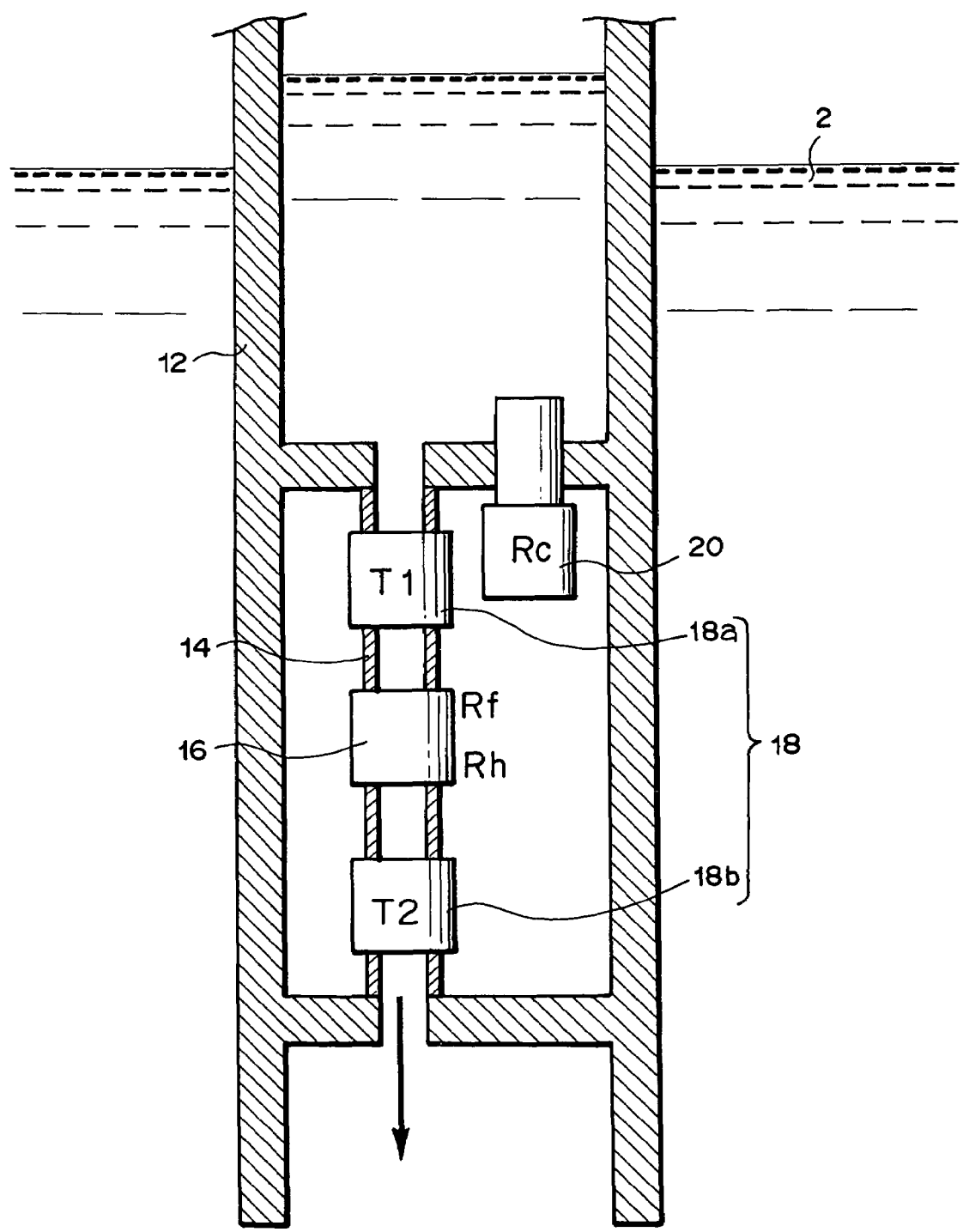
FIG. 1 is a schematic sectional view showing an embodiment of a flowmeter according to the present invention, for use in performing a method of measuring a flow rate according to the present invention.

Embodiments of the present invention will be described hereinafter with reference to the drawings. Corresponding parts, members, or devices over the drawings are denoted with the same reference numerals.

Figure 2:
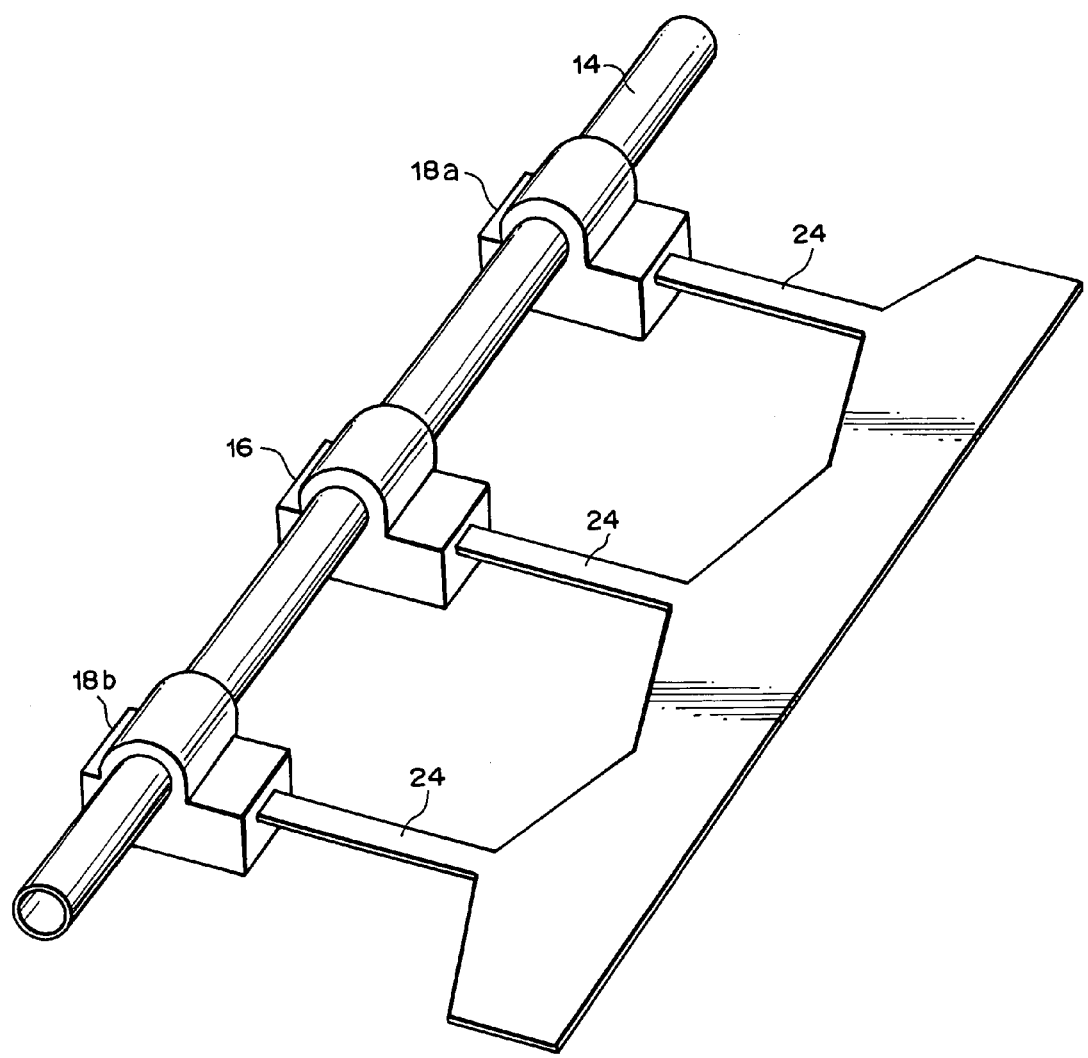
FIG. 2 is a partial perspective view showing a structure of the flowmeter of FIG. 1.
Figure 3:
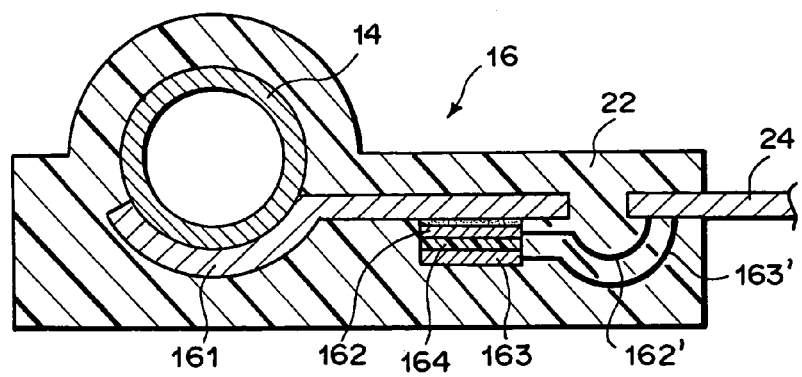
FIG. 3 is a partial sectional view of FIG. 2.
Figure 4:
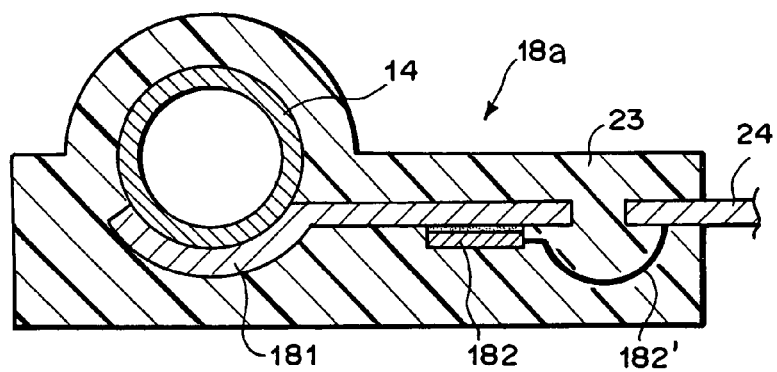
FIG. 4 is a partial sectional view of FIG. 2.
Figure 5:
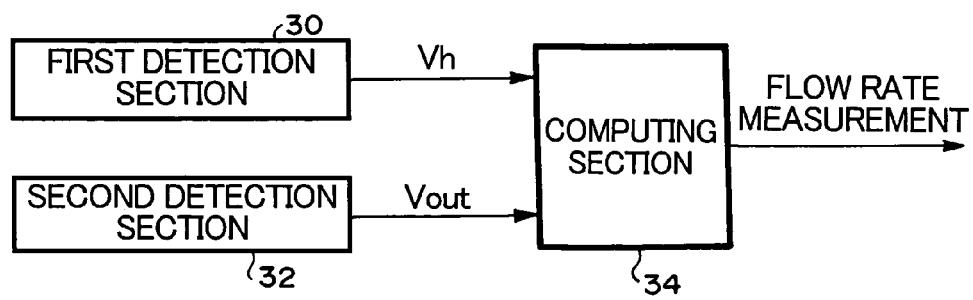
FIG. 5 is a block diagram showing a flow rate measuring system of the flowmeter of FIG. 1.
Figure 6:
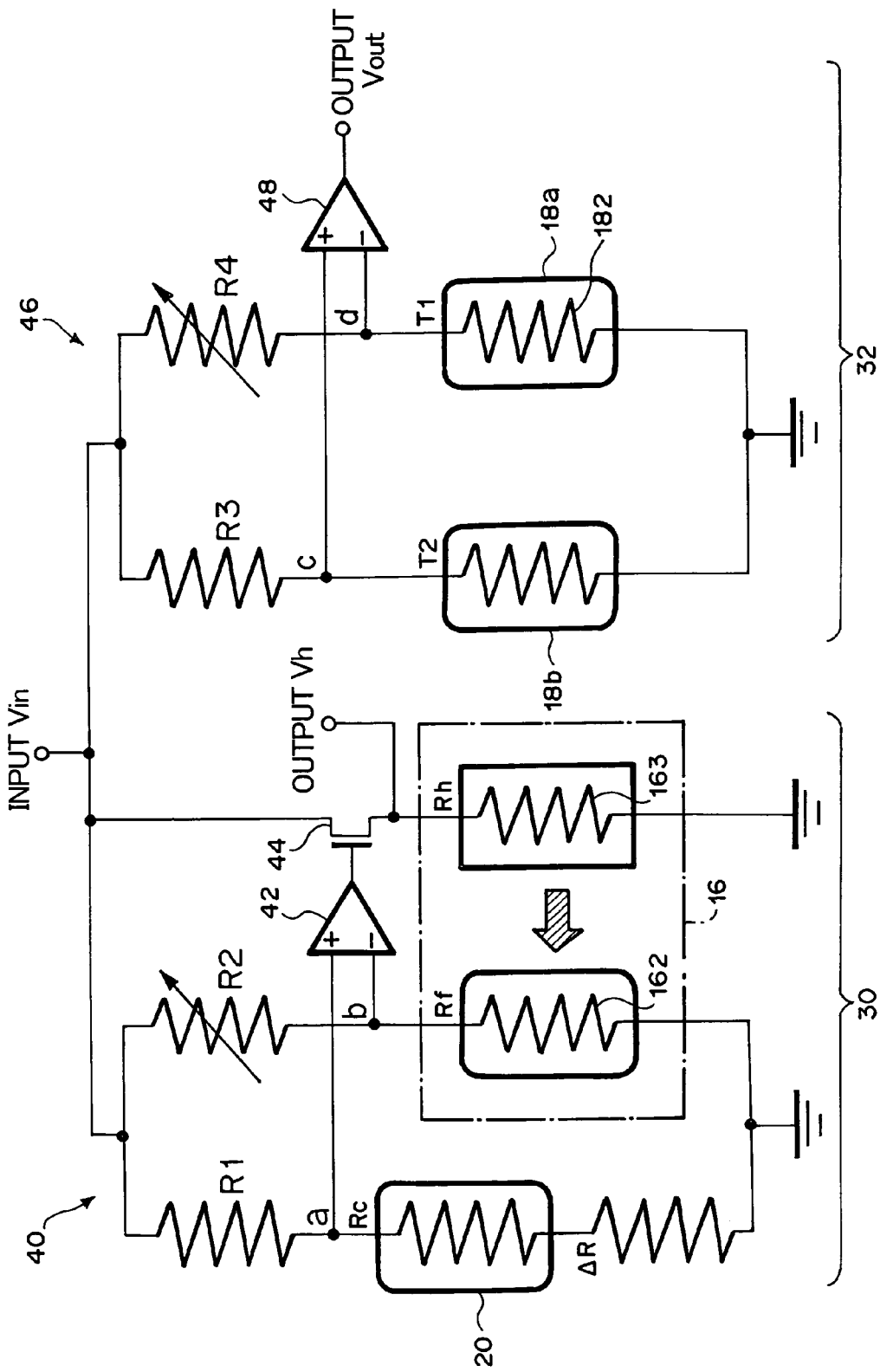
FIG. 6 is a diagram showing a circuit constitution for detecting a flow rate of the flowmeter of FIG. 1.

FIG. 1 is a schematic sectional view showing an embodiment of a flowmeter according to the present invention, for use in performing a method of measuring a flow rate according to the present invention, FIG. 2 is a partial perspective view showing a structure of the flowmeter, FIGS. 3 and 4 are partial sectional views of FIG. 2, FIG. 5 is a block diagram showing a flow rate measuring system of the present embodiment, and FIG. 6 is a diagram showing a circuit constitution for detecting a flow rate of the system. The present embodiment is used in detecting a leakage of a liquid in a tank from the tank.

As shown in FIG. 1, a lower part of a cylindrical measuring tube 12 is immersed in an in-tank liquid (inflammable liquids such as gasoline, light oil, and kerosene) 2. An upper end portion of the measuring tube 12 opens into the atmosphere, and a lower end portion thereof opens in the in-tank liquid 2. In the measuring tube, a fine measuring tube 14 extending in a vertical direction is disposed in a position which is a little above the lower end portion of the measuring tube 12, and the in-tank liquid 2 passes through the fine measuring tube 14. In the present embodiment, the fine measuring tube 14 is used as a fluid channel. In a case where the leakage of the in-tank liquid 2 is generated, under conditions that the liquid is not replenished into the tank or the liquid is not pumped out of the tank, as shown, a liquid level of the in-tank liquid 2 drops below that in the measuring tube 12, and the liquid passes downwards passes through the fine measuring tube 14 based on the drop. When a sectional area of the fine measuring tube 14 is set to be sufficiently small (e.g., 1/50 or less, 1/100 or less, further 1/300 or less) with respect to that of the measuring tube 12, the liquid can be passed through the fine measuring tube 14 to such an extent that the flow rate can be measured even during a little liquid leakage.

As shown in FIG. 1, an indirectly-heated constant-temperature controlling flow rate measuring section 16 and a two-constant-point temperature difference detecting flow rate measuring section 18 are disposed facing the fine measuring tube 14. The two-constant-point temperature difference detecting flow rate measuring section 18 has temperature detecting sections 18a, 18b disposed on upper and lower sides of the indirectly-heated constant-temperature controlling flow rate measuring section 16. A temperature detecting section 20 for detecting the temperature of the liquid in the measuring tube 12 is disposed.

As shown in FIGS. 2 and 3, the fine measuring tube 14 extends through the indirectly-heated constant-temperature controlling flow rate measuring section 16. The indirectly-heated constant-temperature controlling flow rate measuring section 16 has a heat transfer member 161 brought into contact with the outer face of the fine measuring tube 14, a thin-film temperature detecting element or heat sensing element (first temperature detecting element) 162 bonded to the heat transfer member 161, and a thin-film heating element 163 stacked on the thin-film temperature detecting element 162 via an electrically insulating thin film 164. The thin-film temperature detecting element 162 and thin-film heating element 163 are formed into required patterns, and electrodes for energizing the elements are connected to wirings 162', 163'. The heat transfer member 161 is formed of a metal or an alloy, for example, having a thickness of 0.2 mm and a width of about 2 mm.

It is to be noted that these thin-film temperature detecting element 162, electrically insulating thin film 164, and thin-film heating element 163 may be deposited/formed on a support substrate disposed on the side of the thin-film heating element 163, and bonded, together with the support substrate, to the heat transfer member 161 facing the heat transfer member on the side of the thin-film temperature detecting element 162. As the above-described support substrate, for example, a rectangular substrate formed of silicon, alumina or the like and having a thickness of about 0.4 mm and about 2 mm squares can be used.

The wirings 162', 163' are connected to a wiring (not shown) formed on a wiring substrate 24 such as a flexible wiring substrate. The heat transfer member 161, thin-film temperature detecting element 162, electrically insulating thin film 164, thin-film heating element 163, and wirings 1621, 1631 are sealed together with a part of the wiring substrate 24 and a part of the fine measuring tube 14 by a sealing member 22 formed of a synthetic resin.

As shown in FIGS. 2 and 4, the fine measuring tube 14 extends through one temperature detecting section 18a of the two-constant-point temperature difference detecting flow rate measuring section. The temperature detecting section 18a has a heat transfer member 181 brought into contact with the outer face of the fine measuring tube 14, and a thin-film temperature detecting element (second temperature detecting element) 182 bonded to the heat transfer member 181. The thin-film temperature detecting element 182 is formed into a required pattern, and an electrode for energizing the element is connected to a wiring 182'. The heat transfer member 181 is formed of a metal or an alloy, for example, having a thickness of 0.2 mm and a width of about 2 mm in the same manner as in the heat transfer member 161. It is to be noted that the thin-film temperature detecting element 182 formed on the support substrate as described above may be bonded, together with the support substrate, to the heat transfer member 181 in such a manner as to face the member on the side of the thin-film temperature detecting element 182.

The wiring 182' is connected to a wiring (not shown) formed on the wiring substrate 24. The heat transfer member 181, thin-film temperature detecting element 182, and wiring 182' are sealed together with a part of the temperature detecting section 20 and a part of the fine measuring tube 14 by a sealing member 23 formed of a synthetic resin.

The other temperature detecting section 18b of the two-constant-point temperature difference detecting flow rate measuring section has a constitution similar to that of the temperature detecting section 18a, and is sealed together with a part of the wiring substrate 24 and a part of the fine measuring tube 14 by the sealing member formed of the synthetic resin. Additionally, an element of the temperature detecting section 18a, corresponding to a thin-film temperature detecting element functioning as the second temperature detecting element, functions as a third temperature detecting element in the temperature detecting section 18b.

The thin-film temperature detecting element 162, thin-film heating element 163, and wirings 162', 163' for the elements in the indirectly-heated constant-temperature controlling flow rate measuring section 16, and further the temperature detecting section 20 constitute a first detection circuit 30 of FIG. 5. The thin-film temperature detecting element (second temperature detecting element) 182 of the temperature detecting section 18a, and the thin-film temperature detecting element (third temperature detecting element) of the temperature detecting section 18b in the two-constant-point temperature difference detecting flow rate measuring section constitute a second detection circuit 32 of FIG. 5. An output (hereinafter referred to as "flow rate value output" or "flow rate corresponding output") Vh corresponding to a flow rate value of the indirectly-heated constant-temperature controlling flow rate measuring is output from the first detection circuit 30, and an output (hereinafter referred to simply as "flow rate value output") Vout corresponding to the flow rate value of the two-constant-point temperature difference detecting flow rate measuring is output from the second detection circuit 32. These flow rate value outputs are input into a computing section 34 shown in FIG. 5.

As shown in FIG. 6, in the first detection circuit 30 for obtaining the flow rate value output Vh a direct-current voltage input Vin from a power supply circuit (not shown) is supplied to a bridge circuit 40. The bridge circuit 40 includes a temperature detecting section Rf including the thin-film temperature detecting element 162, the temperature detecting section 20 (Rc) including the thin-film temperature detecting element for temperature compensation, resistance elements ΔR, R1, and a variable resistance element R2. Potentials Va, Vb of points a, b of the bridge circuit 40 are input into a differential amplification circuit 42. It is to be noted that the differential amplification circuit 42 preferably includes a variable resistance element, an integration circuit and the like for adjusting response characteristics of feedback control described below.

On the other hand, the input Vin is supplied to the thin-film heating element 163 via a transistor 44 for controlling a current supplied to the heating element Rh including the thin-film heating element 163. An output of the differential amplification circuit 42 is input into a control input terminal (gate) of the transistor 44. That is, in the indirectly-heated constant-temperature controlling flow rate measuring section 16, the temperature detection by the thin-film temperature detecting element 162 is executed based on the heating of the thin-film heating element 163 under an influence of heat absorption by the liquid via the heat transfer member 161. Moreover, as a result of the temperature detection, a difference between the potentials Va, Vb of the points a, b of the bridge circuit 40 shown in FIG. 6 is obtained.

A value of (Va−Vb) changes, when the temperature of the temperature detecting element 162 changes in accordance with the flow rate of the fluid. When the resistance values of the resistance elements ΔR, R1 and the variable resistance element R2 of the bridge circuit 40 are appropriately set beforehand, the value of (Va−Vb) can be zeroed with a desired fluid flow rate which is a reference. In the reference flow rate, the output of the differential amplification circuit 42 becomes constant (value corresponding to the reference flow rate), and the resistance value of the transistor 44 is also constant. In this case, a divided voltage applied to the thin-film heating element 163 is also constant, and the voltage output Vh at this time indicates the reference flow rate.

When the fluid flow rate increases/decreases, polarity (which differs with positive/negative resistance-temperature characteristics of the temperature detecting element 162) and magnitude of the output of the differential amplification circuit 42 change in accordance with the value of (Va−Vb), and accordingly the output of the differential amplification circuit 42 changes.

When the fluid flow rate increases, the temperature of the temperature detecting element 162 drops, and therefore the differential amplification circuit 42 controls an input with respect to a gate of the transistor 44 in such a manner as to decrease the resistance value of the transistor 44, so that a heating value of the thin-film heating element 163 is increased (i.e. power is increased).

On the other hand, when the fluid flow rate decreases, the temperature of the temperature detecting element 162 rises, and therefore the differential amplification circuit 42 controls an input with respect to the gate of the transistor 44 in such a manner as to increase the resistance value of the transistor 44, so that the heating value of the thin-film heating element 163 is decreased (i.e. power is decreased).

As described above, the heating of the thin-film temperature detecting element 162 is feedback-controlled regardless of the change of the fluid flow rate in such a manner that the temperature detected by the temperature detecting element 162 indicates a target value. Moreover, in this case, since the voltage applied to the thin-film heating element 162 corresponds to the fluid flow rate, the voltage is taken as the flow rate value output Vh.

As described above, the indirectly-heated constant-temperature controlling measuring is performed. In the indirectly-heated constant-temperature controlling measuring described in the present invention, the heating element is disposed adjacent to the first temperature detecting element, the heating element is feedback-controlled based on a detected temperature (in actual, electric characteristics detected corresponding to the detected temperature) of the first temperature detecting element, and a first flow rate corresponding output is obtained from a state of the feedback control.

Moreover, as shown in FIG. 6, in the second detection circuit 32 for obtaining the flow rate value output Vout, the direct-current voltage input Vin is supplied to a bridge circuit 46. The bridge circuit 46 includes the temperature detecting section 18*a* (T1) including the thin-film temperature detecting element 182, the temperature detecting section 18*b* (T2) including the thin-film temperature detecting element, a resistance element R3, and a variable resistance element R4. Potentials Vc, Vd of points c, d of the bridge circuit 46 are input into a differential amplifier circuit 48. When the resistance values of the resistance element R3 and variable resistance element R4 of the bridge circuit 46 are appropriately set beforehand, a voltage output corresponding to a difference between detected temperatures of the temperature detecting sections 18*a*, 18*b* can be obtained from the differential amplifier circuit 48.

As described above, in the indirectly-heated constant-temperature controlling flow rate measuring section 16, heat is generated from the thin-film heating element 163, and a part of the heat is transferred to the liquid via the heat transfer member 161, and utilized as a heat source for heating the liquid. The temperature of the thin-film temperature detecting element (first temperature detecting element) 162 is controlled to indicate a predetermined value, and the temperature can be set to be lower than a flash point of the liquid. Therefore, the element can be applied to the flow rate measuring of the inflammable fluid.

When the liquid does not passes therethrough, the detected temperature of the temperature detecting section 18*a* is equal to that of the temperature detecting section 18*b*. However, when the liquid passes therethrough, an influence of the liquid heating by the heat source is stronger on a downstream side than on an upstream side, and therefore the detected temperature of the temperature detecting section 18*a* is different from that of the temperature detecting section 18*b*. Since the voltage output corresponding to the difference between the detected temperatures of the temperature detecting sections 18*a*, 18*b* corresponds to the fluid flow rate, the output is set to the flow rate value output Vout.

As described above, two-constant-point temperature difference detecting flow rate measuring is performed. In the two-constant-point temperature difference detecting flow rate measuring, referred to in the present invention, a second flow rate corresponding output is obtained based on the temperature difference (in actual, the difference of the electric characteristics detected in accordance with the detected temperature difference) detected by the second and third temperature detecting elements disposed on the upstream and downstream sides of the indirectly-heated constant-temperature controlling flow rate measuring section, respectively.

Next, an operation of the computing section 34 will be described.

Figure 7:
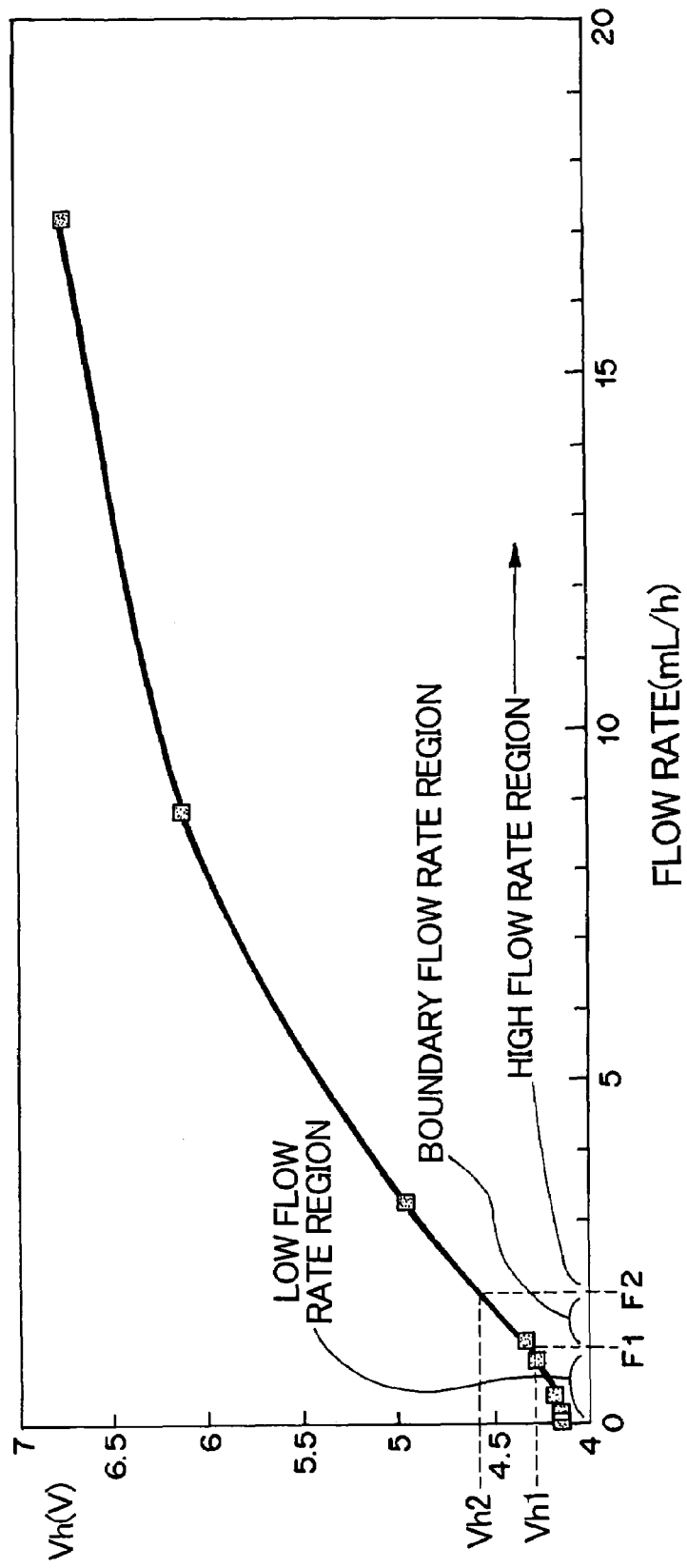
FIG. 7 is a diagram showing an example of a calibration curve for conversion of Vh.
Figure 8:
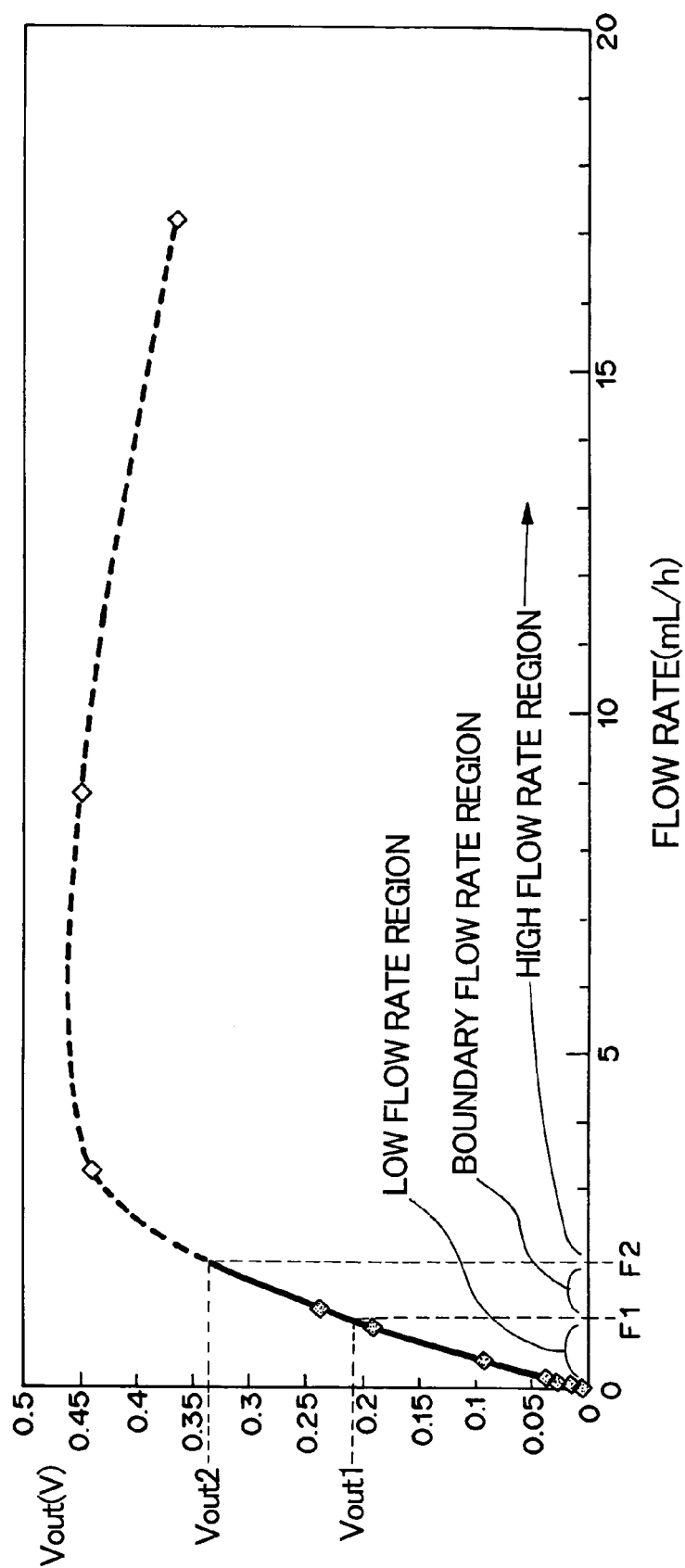
FIG. 8 is a diagram showing an example of the calibration curve for the conversion of Vout.

In the computing section 34, conversion into the corresponding flow rate value is performed using built-in calibration curves based on Vh and Vout. FIG. 7 shows an example of the calibration curve for the conversion of Vh, and FIG. 8 shows an example of the calibration curve for the conversion of Vout. As shown in these figures, a region in which the flow rate value is F1 or more and F2 or less is predetermined as a boundary flow rate region. The flow rate values F1, F2 which set upper and lower limits of the boundary flow rate region can be set to the values, for example, in a rage of 1 milliliter/h (mL/h) to 2 milliliters/h (mL/h). A region whose flow rate value is less than F1 is set to a low flow rate region, and a region whose flow rate value exceeds F2 is set to a high flow rate region. As shown in FIG. 7, in the calibration curve for the conversion of Vh, an output corresponding to the flow rate value F1 is set to Vh1, and an output corresponding to the flow rate value F2 is set to Vh2. As shown in FIG. 8, in the calibration curve for the conversion of Vout, an output corresponding to the flow rate value F1 is set to Vout1, and an output corresponding to the flow rate value F2 is set to Vout2.

In the computing section 34, the flow rate value obtained based on the first flow rate corresponding output Vh is output as a measurement with respect to the high flow rate region, the flow rate value obtained based on the second flow rate corresponding output Vout is output as a measurement with respect to the low flow rate region, and the flow rate value obtained based on the first flow rate corresponding output Vh or the second flow rate corresponding output Vout is output as a measurement with respect to the boundary flow rate region.

Concretely, first the flow rate of the fluid is measured by the indirectly-heated constant-temperature controlling flow rate measuring (i.e., the flow rate value obtained based on the first flow rate corresponding output Vh is obtained). When the obtained flow rate value belongs to the high flow rate region (i.e., the output Vh exceeds Vh2), the flow rate value is output as the measurement. In another case, the flow rate of the fluid is measured by the two-constant-point temperature difference detecting flow rate measuring (i.e., the flow rate value obtained based on the second flow rate corresponding output Vout is obtained), and the obtained flow rate value is output as the measurement. Alternatively, when the flow rate value obtained based on the first flow rate corresponding output Vh belongs to one of the high flow rate region and the boundary flow rate region (i.e., the output Vh is Vh1 or more), the flow rate value is output as a measurement. In another case, the flow rate value obtained based on the second flow rate corresponding output Vout may be output as the measurement.

In another method, first the flow rate of the fluid is measured by the two-constant-point temperature difference detecting flow rate measuring (i.e., the flow rate value obtained based on the second flow rate corresponding output Vout is obtained). When the obtained flow rate value belongs to the low flow rate region (i.e., the output Vout is less than Vout1), the corresponding flow rate value is output as a measurement. In another case, the flow rate of the fluid is measured by the indirectly-heated constant-temperature controlling flow rate measuring (i.e., the flow rate value obtained based on the first flow rate corresponding output Vh is obtained), and the obtained flow rate value is output as a measurement. Alternatively, when the flow rate value obtained based on the second flow rate corresponding output Vout belongs to one of the low flow rate region and the boundary flow rate region (i.e., when the output Vout is Vout2 or less), the flow rate value is output as a measurement. In another case, the flow rate value obtained based on the first flow rate corresponding output Vh may be output as a measurement.

In the present invention, the boundary flow rate region may be constituted of a specific flow rate value only. This specific flow rate value corresponds to a case where F1 described above matches F2, and the above description applies as such.

Integrating concerning time is appropriately performed based on the flow rate (momentary flow rate) measurement output from the computing section 34, and an integrated flow rate can be calculated. The values of the obtained momentary flow rate and integrated flow rate can be appropriately displayed, appropriately stored in a memory, and further transmitted to a desired external device via an appropriate communication circuit.

Figure 9:
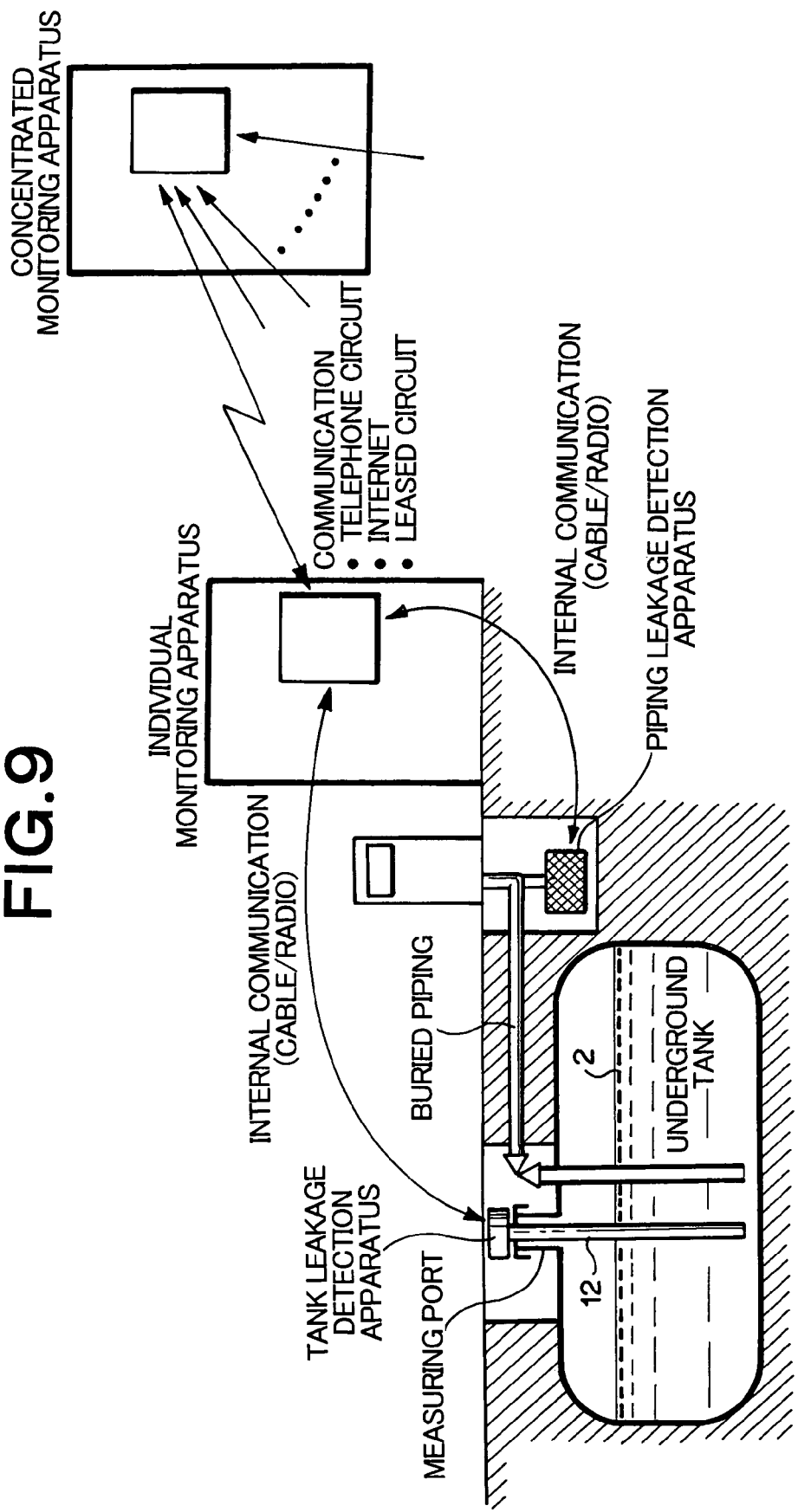
FIG. 9 is a schematic diagram showing one embodiment of a liquid leakage monitoring system using a method of measuring the flow rate and the flowmeter according to the present invention.

As described above, the flow rate is measured. When the flow rate measurement exceeds a measurement error based on the flow rate measurement output from the computing section 34 as a result of the flow rate measuring, it is judged that there is a leakage of the in-tank liquid, and the leakage is detected. The leakage is preferably detected, for example, at night under conditions that any liquid is not replenished into the tank or any liquid is pumped out of the tank. FIG. 9 shows one embodiment of a liquid leakage monitoring system utilizing the above-described leakage detection of the in-tank liquid, and further including the leakage detection of a piping system.

FIG. 9 shows a state in which the measuring tube 12 is inserted downwards into the in-tank liquid 2 from a measuring port of the underground-tank. It is to be noted that a communication hole (not shown) with outside air is formed in an upper part of the measuring tube 12. A tank leakage detection device including the first detection circuit 30, second detection circuit 32, and computing section 34 is disposed above the measuring tube 12. On the other hand, the tank is connected to a buried piping in which the liquid pumped out of the tank passes therethrough, and is provided with a piping leakage detection device which detects the leakage of the liquid from the piping. In the piping leakage detection device, the above-described flow rate measuring method and flowmeter according to the present invention can be used.

The tank leakage detection device and piping leakage detection device are connected to an individual monitoring apparatus disposed for each tank by internal communication means via cable or radio in such a manner that signals can be transmitted/received. The individual monitoring apparatus periodically (e.g., once a day) inquires the tank leakage detection device and the piping leakage detection device of detection results (presence of the leakage, a degree [flow rate] of the leakage, etc.). Leakage data obtained from the leakage detection device is stored in a memory of the individual monitoring apparatus. The data stored in this memory is constituted of a part indicating tank leakage detection results, and a part indicating piping leakage detection results.

The individual monitoring apparatus is capable of transmitting/receiving signals to/from a concentrated monitoring apparatus disposed for a plurality of tanks via communication means by a telephone circuit, internet, or leased circuit. The concentrated monitoring apparatus inquires a plurality of individual monitoring apparatuses of the detection results stored in the memories of the individual monitoring apparatuses as needed. The leakage data obtained from the individual monitoring apparatus is stored in the memory of the concentrated monitoring apparatus, and is appropriately output by display and printing. The data stored in the memory is constituted of a part of an identification number of each individual monitoring apparatus (or the underground tank monitored by the individual monitoring apparatus), a part indicating the corresponding tank leakage detection result, and a part indicating a piping leakage detection result.

The individual monitoring apparatus is installed in the same place as that where the tank is installed or in the vicinity of the place, for example, in a gas station office, facility management office, guard office or the like. It is to be noted that functions of the above-described individual monitoring apparatuses with respect to a plurality of tanks may be integrated to constitute one composite monitoring apparatus. The leakage data stored in the individual monitoring apparatus or composite monitoring apparatus can be directly read and displayed from the monitoring apparatus. On the other hand, the concentrated monitoring apparatus can be disposed in a position unrelated to the position of each tank, such as a concentrated management center, a public inspection institution, or the like.

A flow rate measuring section package and a flow rate measuring unit according to the present invention are usable in the flowmeter described above with reference to FIGS. 1 to 9. In this case, the temperature detecting section 18a is an upstream-side temperature detecting section, and the temperature detecting section 18b is a downstream-side temperature detecting section. The first detection circuit 30 and the second detection circuit 32 are also included to constitute an analog circuit. The flow rate value outputs Vh, Vout of the analog circuit are input into the computing section 34 shown in FIG. 5. The computing section 34 is included to constitute a digital circuit.

Figure 10:
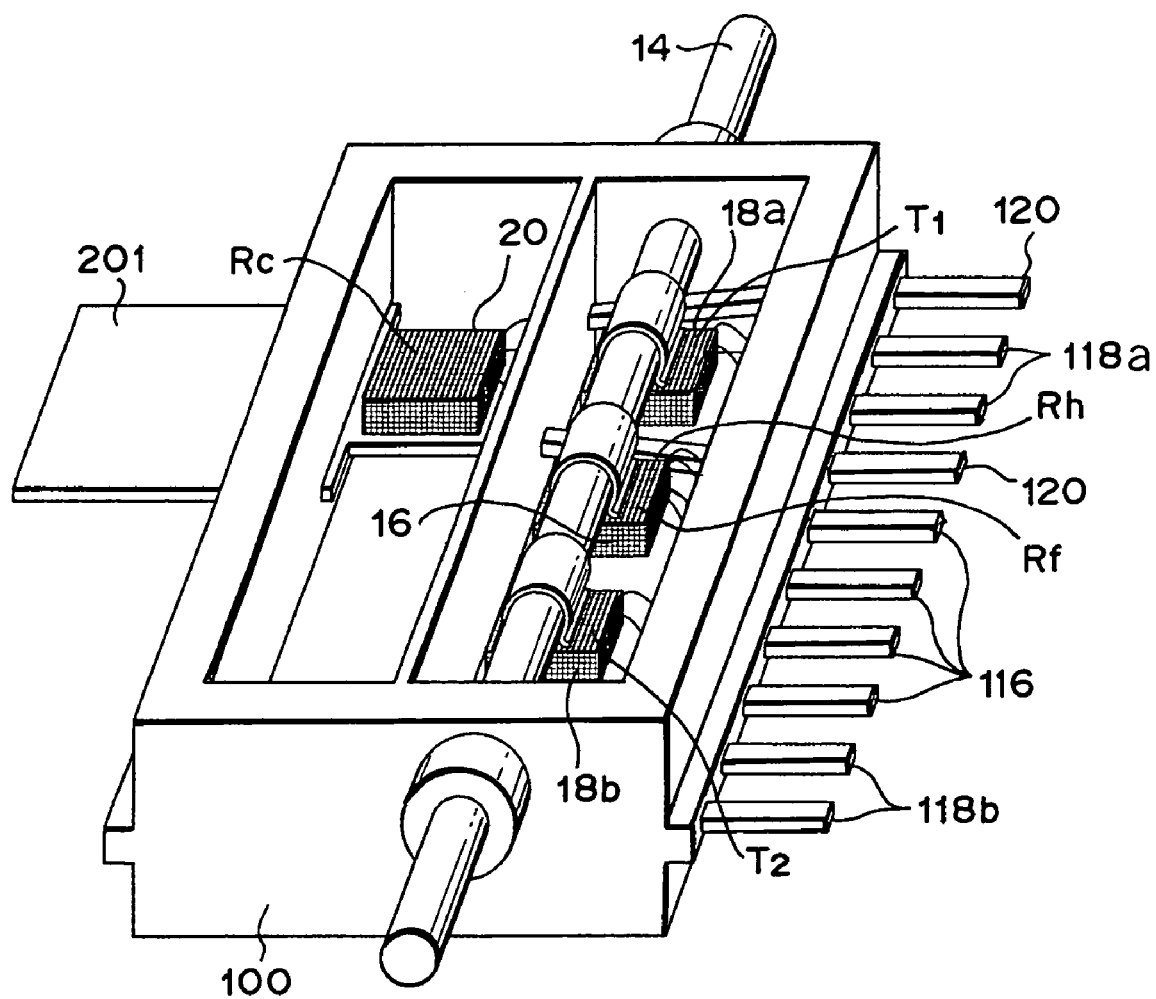
FIG. 10 is a partially omitted perspective view showing an embodiment of a flow rate measuring section package according to the present invention.
Figure 11A:
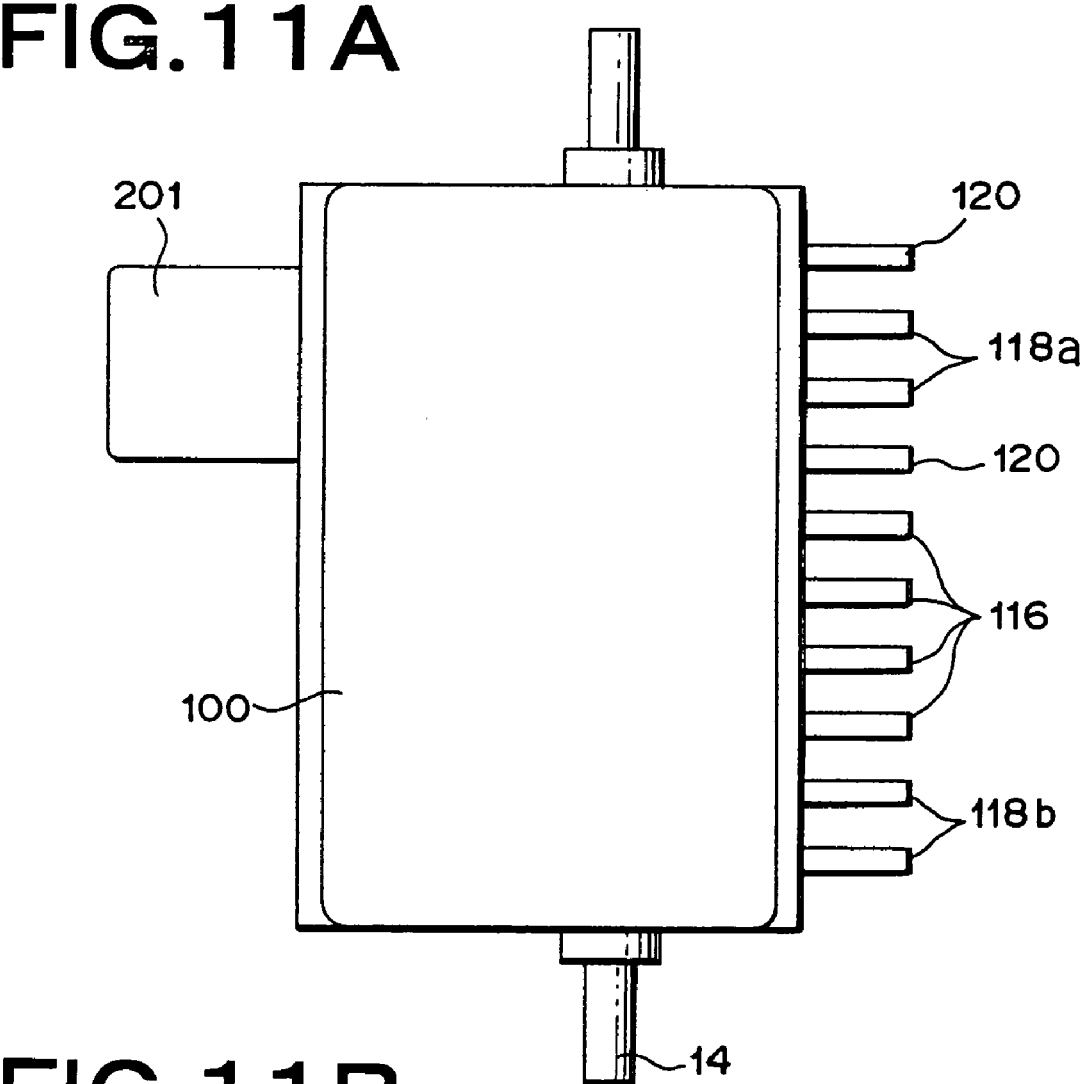
FIG. 11A is a plan view of the flow rate measuring section package of FIG. 10.
Figure 11B:
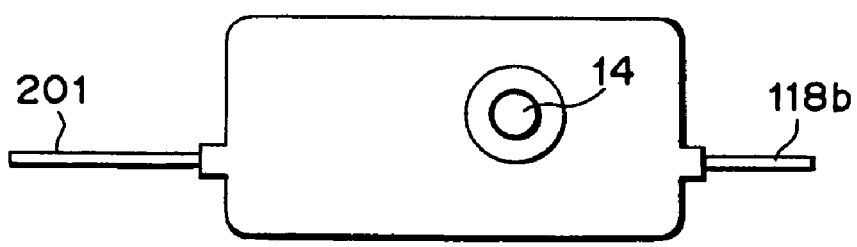
FIG. 11B is a plan view of the flow rate measuring section package of FIG. 10.
Figure 12A:
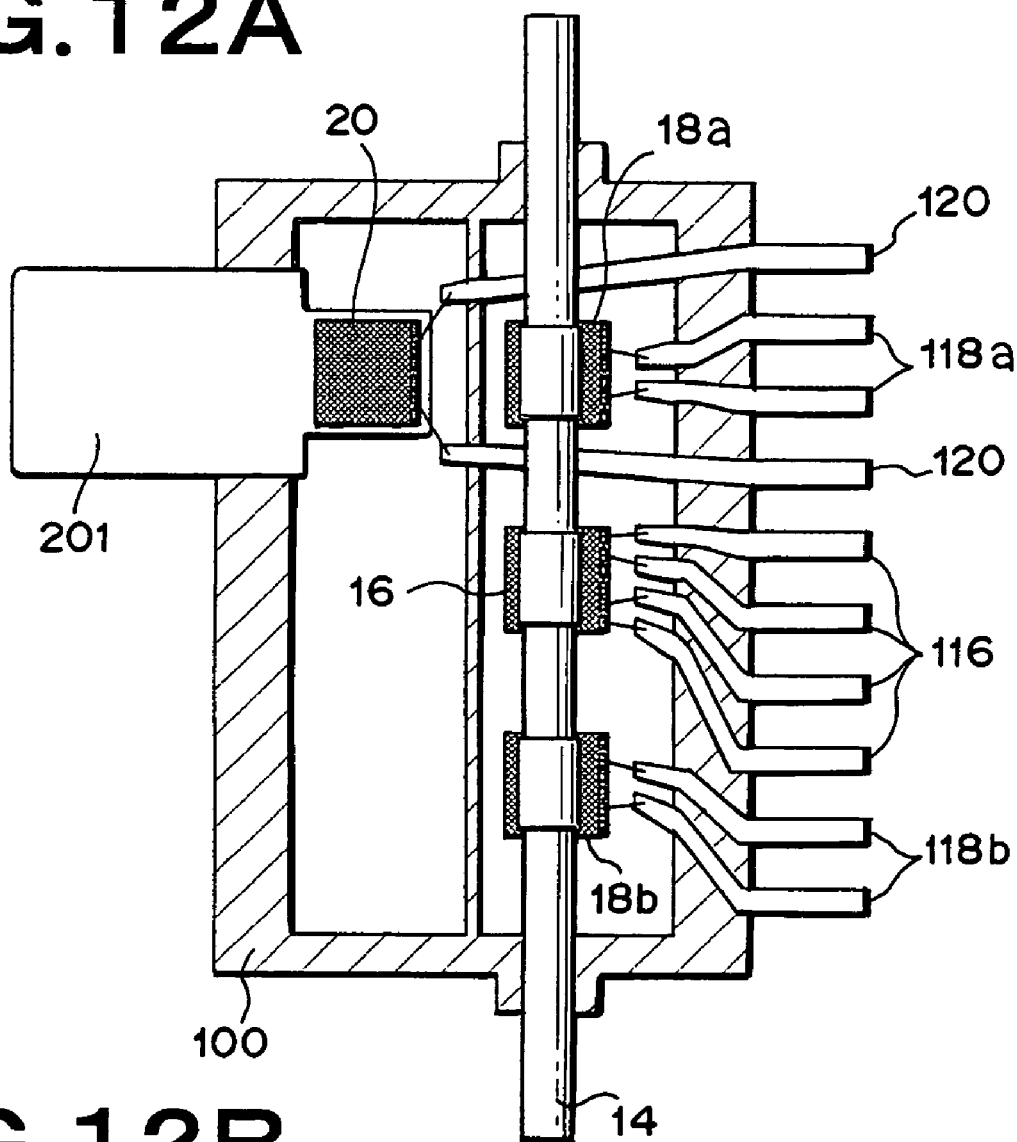
FIG. 12A is a transversely sectional view of the flow rate measuring section package of FIG. 10.
Figure 12B:
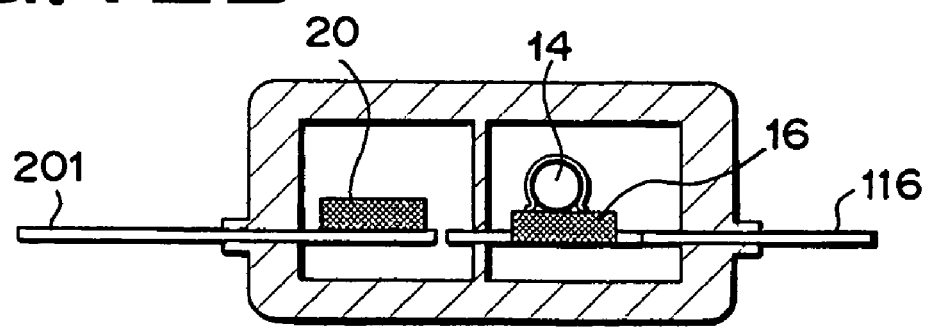
FIG. 12B is a vertically sectional view of the flow rate measuring section package of FIG. 10.

FIG. 10 is a partially omitted perspective view showing another embodiment of the flow rate measuring section package according to the present invention, FIGS. 11A and 11B are a plan view and a front view of the package, and FIGS. 12A and 12B are a transversely sectional view and a vertically sectional view of the package.

In the present embodiment, an indirectly-heated constant-temperature controlling flow rate measuring section 16, an upstream-side temperature detecting section 18a, a downstream-side temperature detecting section 18b, and a part of a fluid channel 14 to which they are attached are accommodated in a casing 100. First terminals 116 constituting first wiring sections electrically connected to a thin-film heating element 163 and a thin-film temperature detecting element 162 of the indirectly-heated constant-temperature controlling flow rate measuring section 16 are extended outwards from the casing 100. Second terminals 118a constituting second wiring sections electrically connected to a thin-film temperature detecting element 182 of the upstream-side temperature detecting section 18a are extended outwards from the casing 100. Similarly, third terminals 118b constituting third wiring sections electrically connected to the thin-film temperature detecting element of the downstream-side temperature detecting section 18b are extended outwards from the casing 100.

Furthermore, a temperature detecting section 20 having a temperature detecting element for temperature compensation is accommodated in the casing 100, and the temperature detecting section 20 is connected to a heat transfer member 201 extending out of the casing 100. In the above-described embodiment of FIG. 1, the temperature detecting section 20 is used in which the heat transfer member extends into the liquid in order to detect the temperature of the liquid as an environment temperature. However, in the present embodiment, the temperature detecting section 20 detects an ambient air temperature of the casing 100 as the environment temperature. Moreover, in the casing 100, fourth terminals 120 constituting four wiring sections electrically connected to the temperature detecting element for temperature compensation are extended outwards from the casing 100.

In the present embodiment, as shown in FIG. 12A, the first to fourth terminals are connected to predetermined thin-film heating elements or thin-film temperature detecting elements of the indirectly-heated constant-temperature controlling flow rate measuring section 16, upstream-side temperature detecting section 18a, downstream-side temperature detecting section 18b, and temperature detecting section 20 via bonding wires.

Figure 13A:
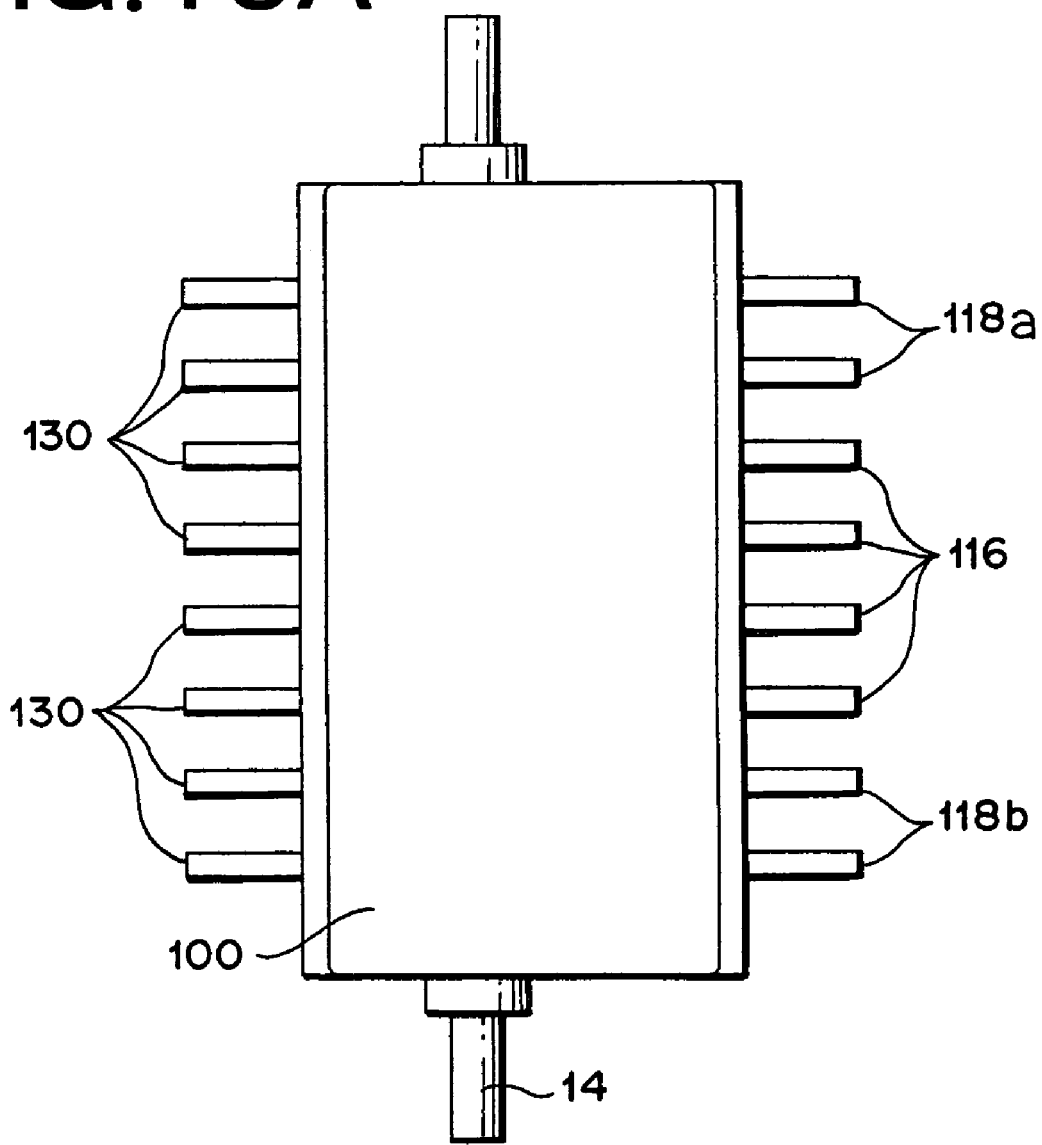
FIG. 13A is a plan view showing an embodiment of the flow rate measuring section package according to the present invention.
Figure 13B:
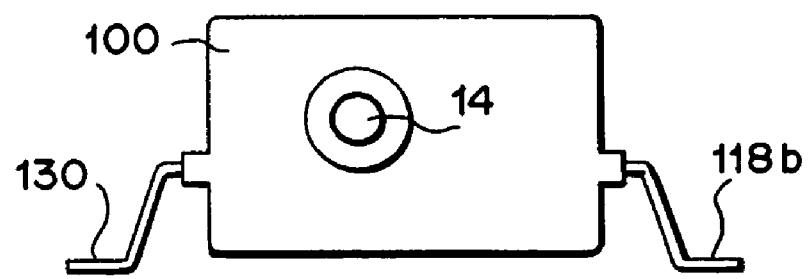
FIG. 13B is a front view showing an embodiment of the flow rate measuring section package according to the present invention.
Figure 14A:
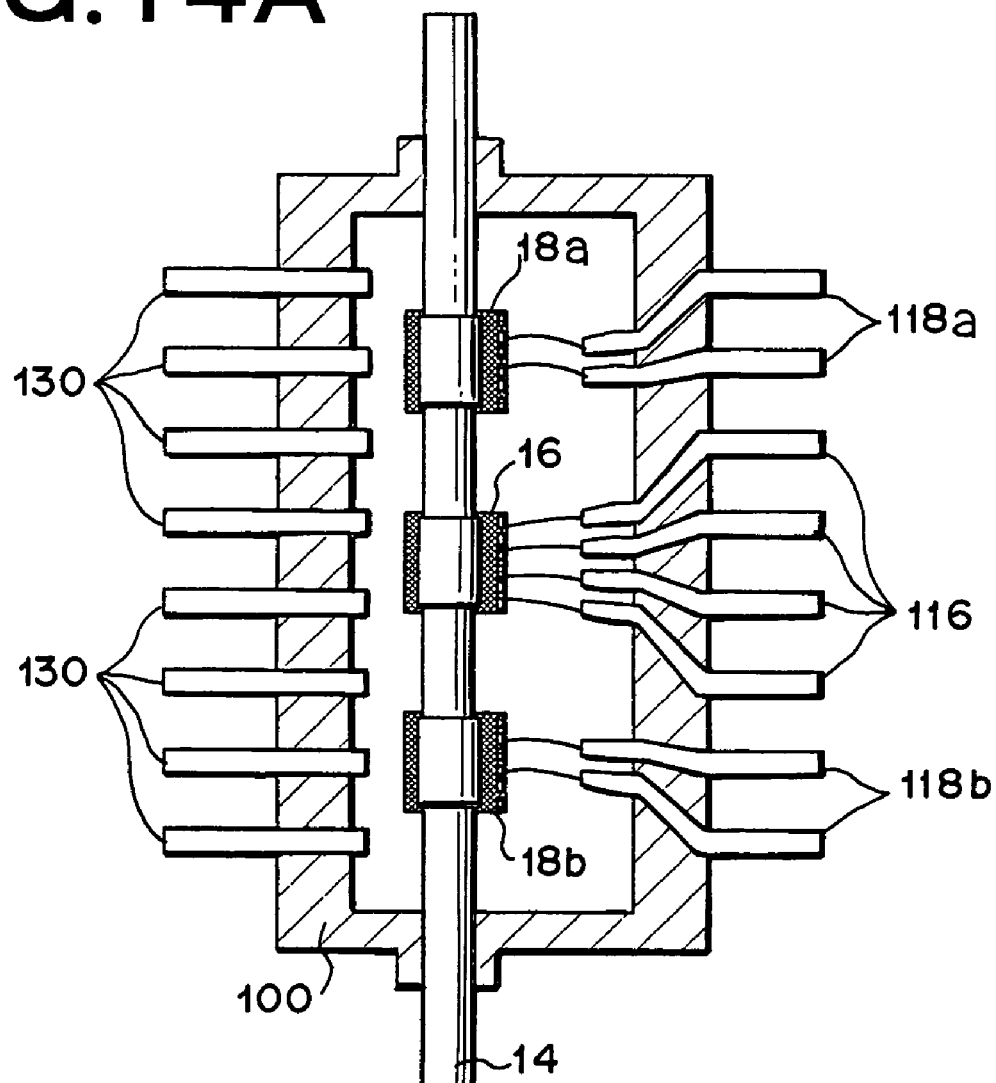
FIG. 14A is a transversely sectional view of the flow rate measuring section package of FIGS. 13A and 13B.
Figure 14B:
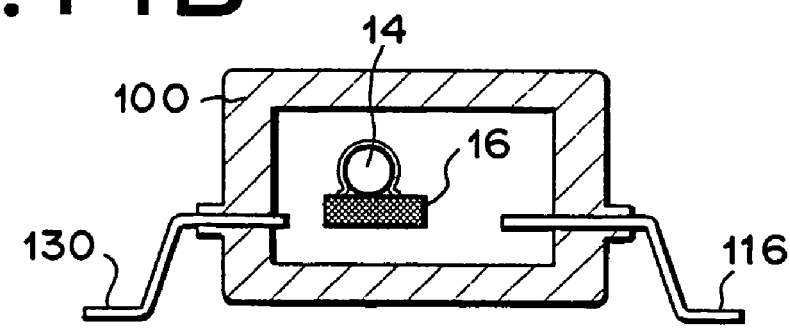
FIG. 14B is a vertically sectional view of the flow rate measuring section package of FIGS. 13A and 13B.

FIGS. 13A and 13B are a plan view and a front view showing still another embodiment of the flow rate measuring section package according to the present invention, and FIGS. 14A and 14B are a transversely sectional view and a vertically sectional view of the package, respectively. The present embodiment is different from the above-described embodiment of FIGS. 10 to 12B in that the temperature detecting section 20, heat transfer member 201, and fourth terminals 120 are not disposed. The present embodiment is provided with preliminary terminals 130 for mounting the flow rate measuring unit described later onto a unit substrate. Some of the preliminary terminals 130 can be used for wirings.

FIG. 15 is a perspective view showing an embodiment of the flow rate measuring unit according to the present invention, and FIGS. 16A, 16B, and 16C are a plan view, a front view, and a side view of the unit, respectively. In the present embodiment, a flow rate measuring section package 200 of FIGS. 10 to 12B, described above, is attached to a unit substrate 220 in such a manner that the first to fourth terminals extend parallel with respect to the unit substrate 220 on which a required circuit is formed, and further an analog circuit element 222 constituting a flow rate measuring circuit element is attached to the unit substrate 220. Accordingly, the first detection circuit 30 and the second detection circuit 32 shown in FIGS. 5 and 6 are formed. The flow rate measuring circuit element may further include a digital circuit element forming the computing section 34 shown in FIG. 5.

Figure 17:
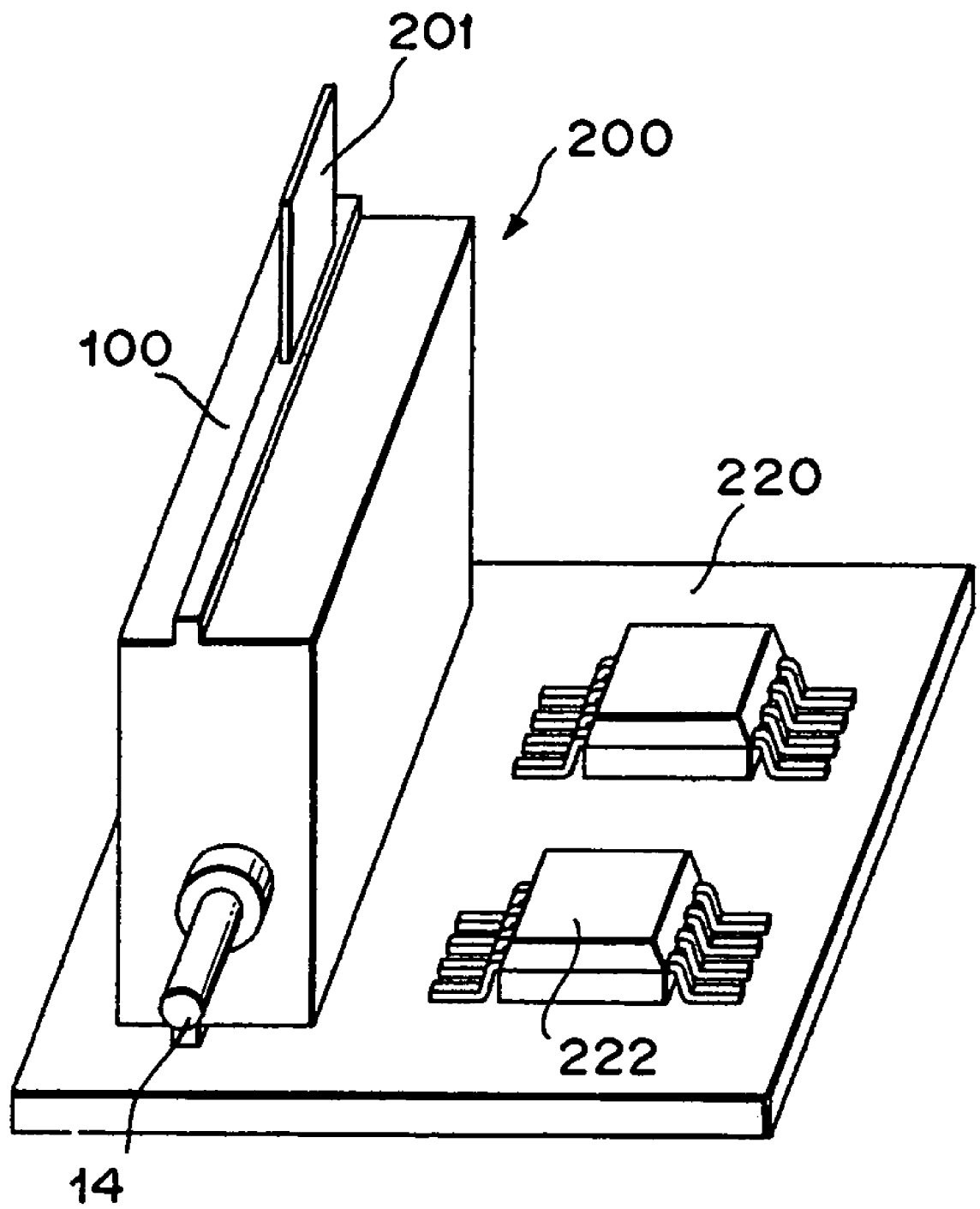
FIG. 17 is a perspective view showing an embodiment of the flow rate measuring unit according to the present invention.
Figure 18C:
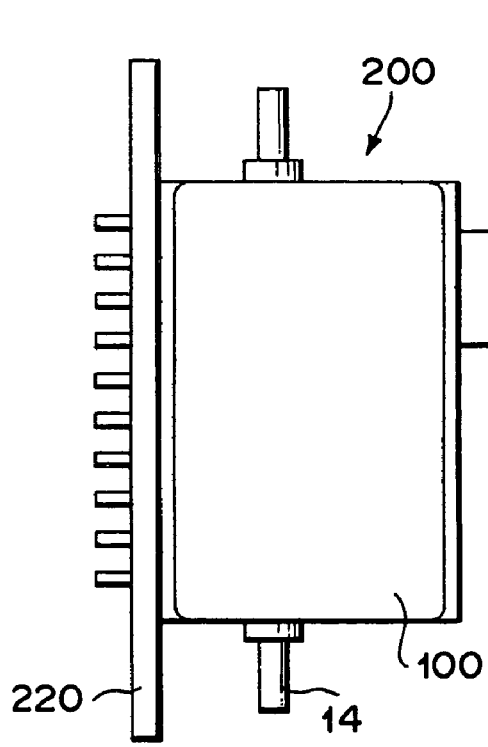
FIG. 18C is a side view of the flow rate measuring unit of FIG. 17.
Figure 18A:
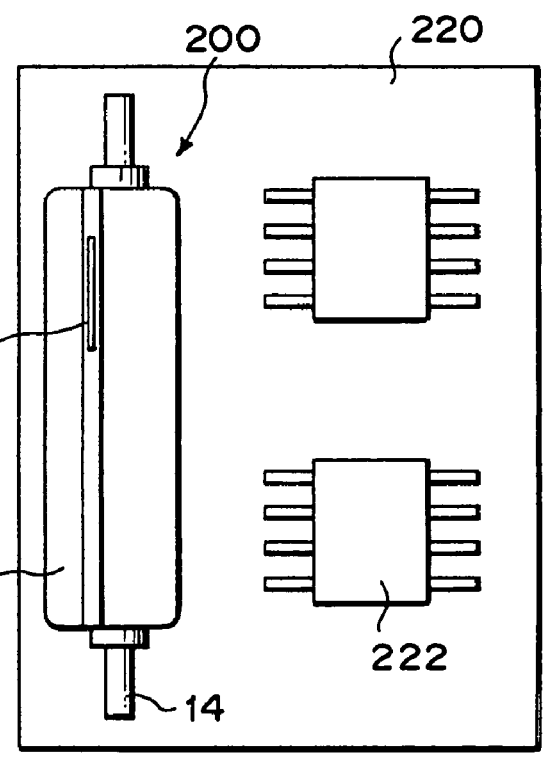
FIG. 18A is a plan view of the flow rate measuring unit of FIG. 17.
Figure 18B:
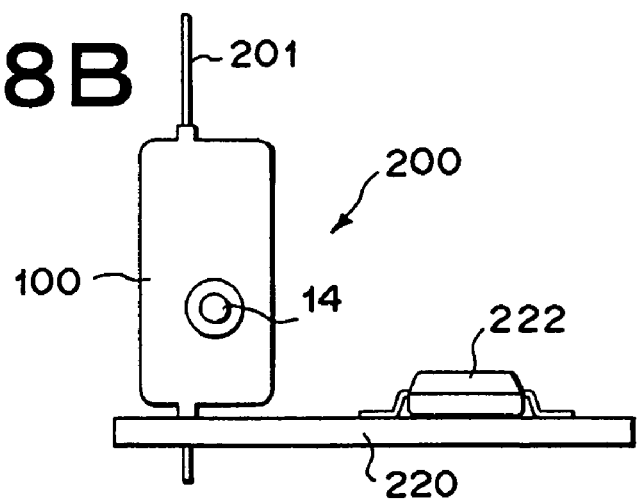
FIG. 18B is a front view of the flow rate measuring unit of FIG. 17.

FIG. 17 is a perspective view showing still another embodiment of the flow rate measuring unit according to the present invention, and FIGS. 18A, 18B, and 18C are a plan view, front view, and side view of the unit, respectively. The present embodiment is different from the flow rate measuring unit of FIGS. 15 to 16C in that a flow rate measuring section package 200 is attached to a unit substrate 220 in such a manner that the first to fourth terminals extend vertically with respect to the unit substrate 220.

Figure 19:
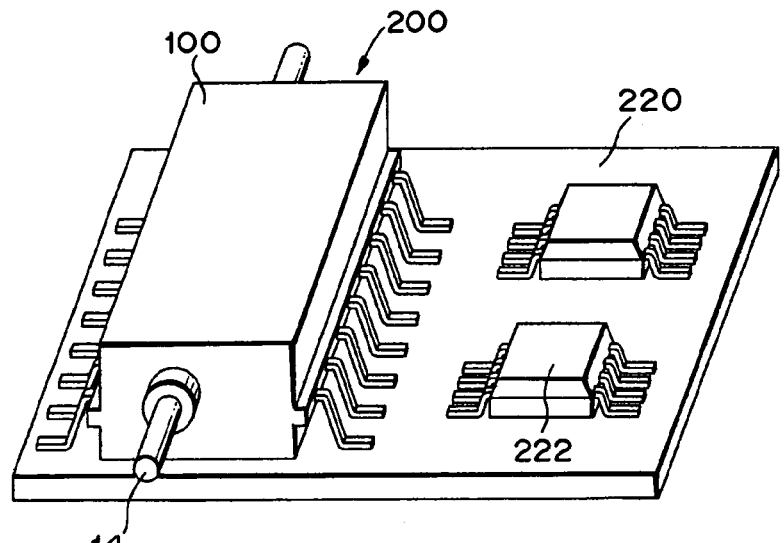
FIG. 19 is a perspective view showing an embodiment of the flow rate measuring unit according to the present invention.
Figure 20C:
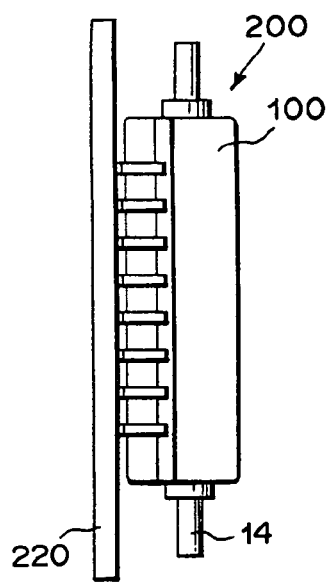
FIG. 20C is a side view of the flow rate measuring unit of FIG. 19.
Figure 20A:
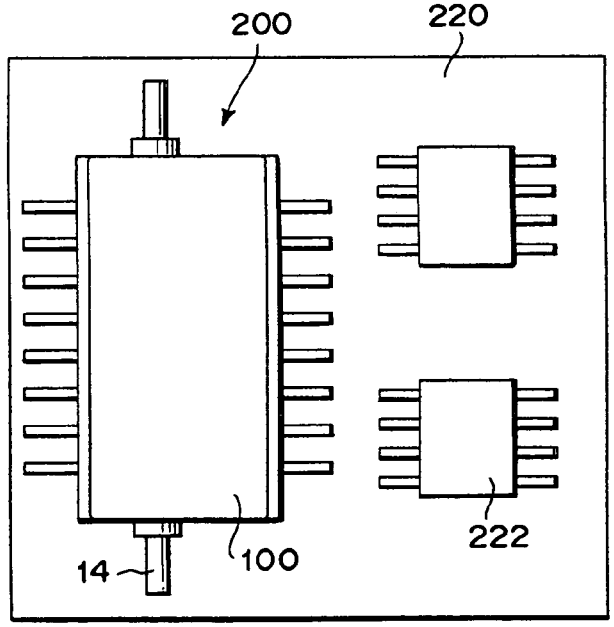
FIG. 20A is a plan view of the flow rate measuring unit of FIG. 19.
Figure 20B:
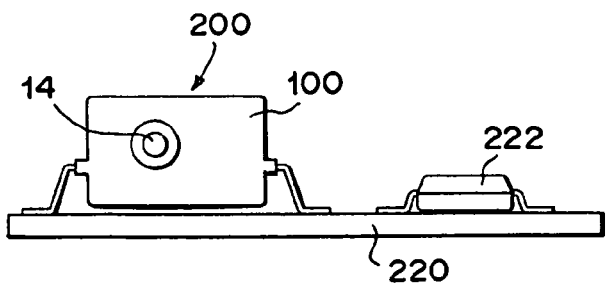
FIG. 20B is a front view of the flow rate measuring unit of FIG. 19.

FIG. 19 is a perspective view showing still another embodiment of the flow rate measuring unit according to the present invention, and FIGS. 20A, 20B, and 20C are a plan view, front view, and side view of the unit, respectively. The present embodiment is different from the flow rate measuring unit of FIGS. 15 to 18C in that the package of the embodiment of FIGS. 13A to 14B is used as the flow rate measuring section package 200.

Figure 21:
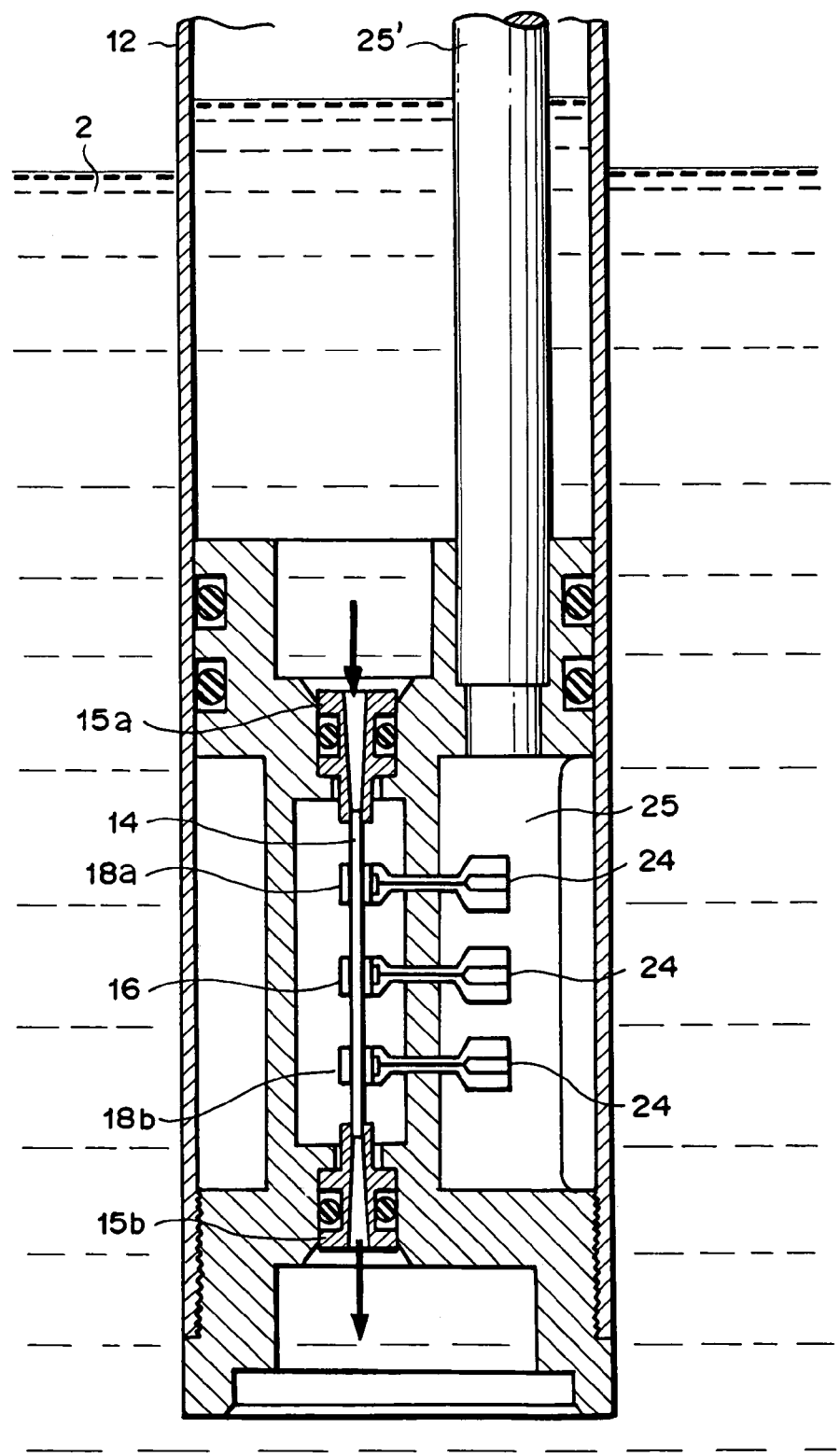
FIG. 21 is a sectional view showing an embodiment of incorporation of the flow rate measuring section package according to the present invention into the flowmeter.

FIG. 21 is a sectional view showing an embodiment of incorporation of the flow rate measuring section package according to the present invention into the flowmeter. In the present embodiment, a flow rate measuring section package similar to that of the embodiment of FIG. 2 except shapes of wiring substrates 24. Opening end portion members 15a, 15b are attached to opposite vertical ends of a fluid channel 14. On the other hand, the wiring substrates 24 is connected to a wiring substrate 25, and the wiring of the wiring substrate 25 is connected to that inside a wiring housing section 25'. The wiring in the wiring housing section 25' is connected to the detection circuits 30, 32 shown in FIGS. 5 and 6.

Figure 22:
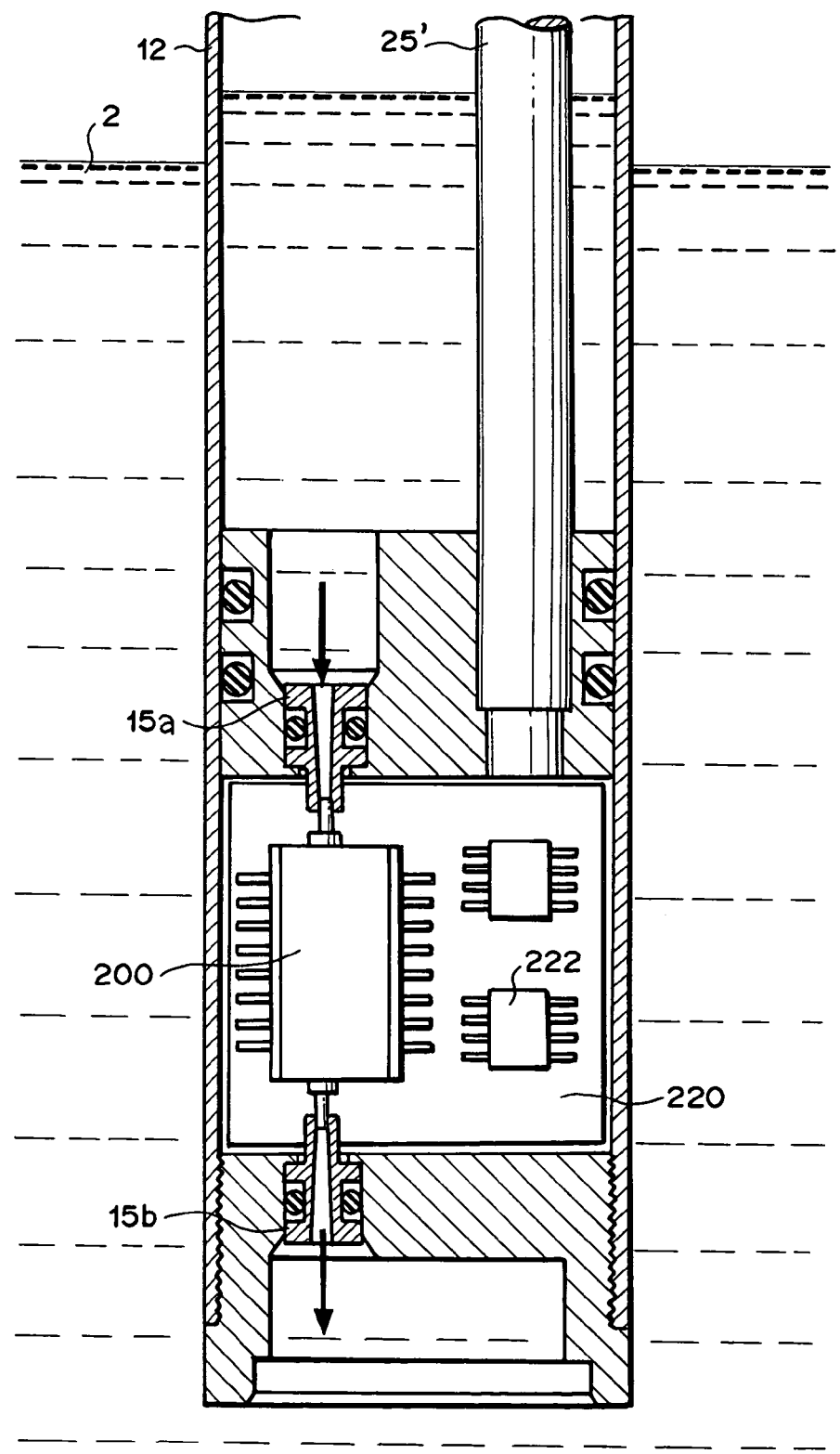
FIG. 22 is a sectional view showing an embodiment of incorporation of the flow rate measuring unit according to the present invention into the flowmeter.

FIG. 22 is a sectional view showing still another embodiment of incorporation of the flow rate measuring unit according to the present invention into the flowmeter. In the present embodiment, the flow rate measuring unit of the embodiment of FIGS. 19 to 20C is used. The wiring of the unit substrate 220 is connected to that in the wiring housing section 25'. The wiring in the wiring housing section 25' is connected to the computing section 34 shown in FIG. 5.

Figure 23:
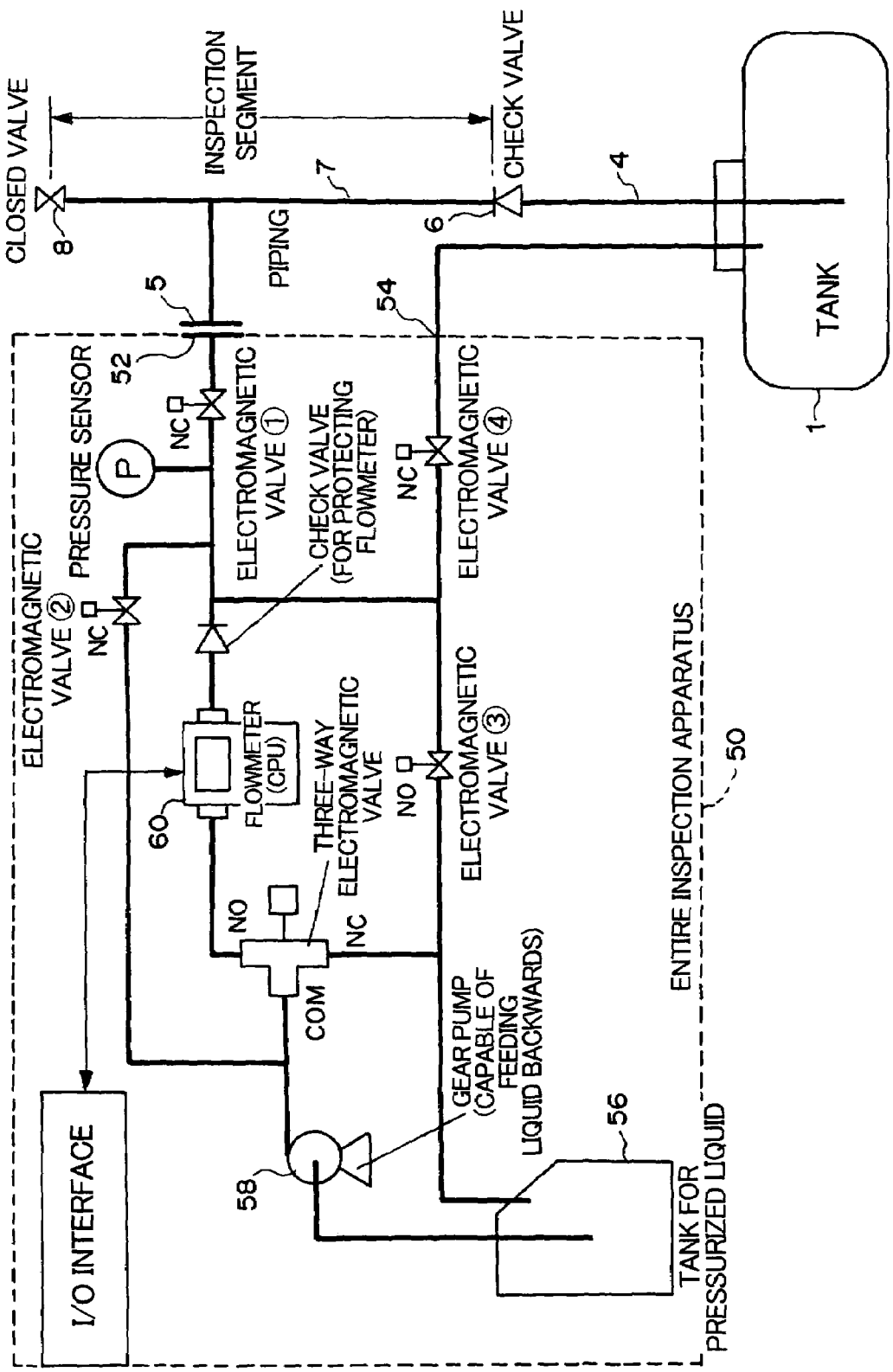
FIG. 23 is a diagram showing one embodiment of a piping leakage inspection apparatus according to the present invention.

FIG. 23 is a diagram showing one embodiment of a piping leakage inspection apparatus or device according to the present invention. In FIG. 23, a tank 1, buried underground, for liquids (inflammable liquids such as gasoline, light oil, and kerosene) is connected to a piping 4 for pumping out the liquid in the tank. In the piping, a check valve 6 and a closed valve 8 intervene, the closed valve is opened during the pumping-out of the liquid, and the liquid is conveyed upwards via the check valve 6 by a drawing pump (not shown) disposed on the upper side (downstream side with respect to a liquid drawing direction).

The part of the piping 4 extending to the closed valve 8 from the check valve 6 is an inspection segment 7, and this part corresponds to a piping to be measured referred to in the present invention. The piping to be measured 7 is buried underground, a branched part is disposed halfway, and a connection end 5 for the connection to the leakage inspection apparatus is formed in the branched part.

On the other hand, a leakage inspection apparatus 50 of the present embodiment has an internal piping system as shown. The internal piping system includes a connection end 52 which communicates with the piping to be measured 7, and a liquid discharge end 54. The inspection apparatus 50 has a tank 56 for temporarily storing a pressurized liquid, connected to the internal piping system, and a pump 58 and a flowmeter 60 disposed in order in a path extending to the connection end 52 from the tank 56 for temporarily storing the pressurized liquid in the internal piping system. In the present embodiment, the pump 58 is a gear pump capable of feeding the liquid backwards. The internal piping system has a three-way electromagnetic valve, a check valve for protecting the flowmeter, a pressure sensor, and four electromagnetic valves (three of them are constantly closed [NC] and the other one is constantly opened [NO]) as the other constituting elements.

An operation of the leakage inspection apparatus of the present embodiment will be described hereinafter together with a function of the internal piping system with reference to FIGS. 24 to 27. The connection end 5 on the side of the piping to be measured is connected to the connection end 52 on the side of the inspection apparatus, so that the connection end 52 communicates with the piping to be measured 7. It is to be noted that this connected state may be constantly maintained. A pipe is disposed between the liquid discharge end 54 of the inspection apparatus and the underground tank 1.

Figure 24:
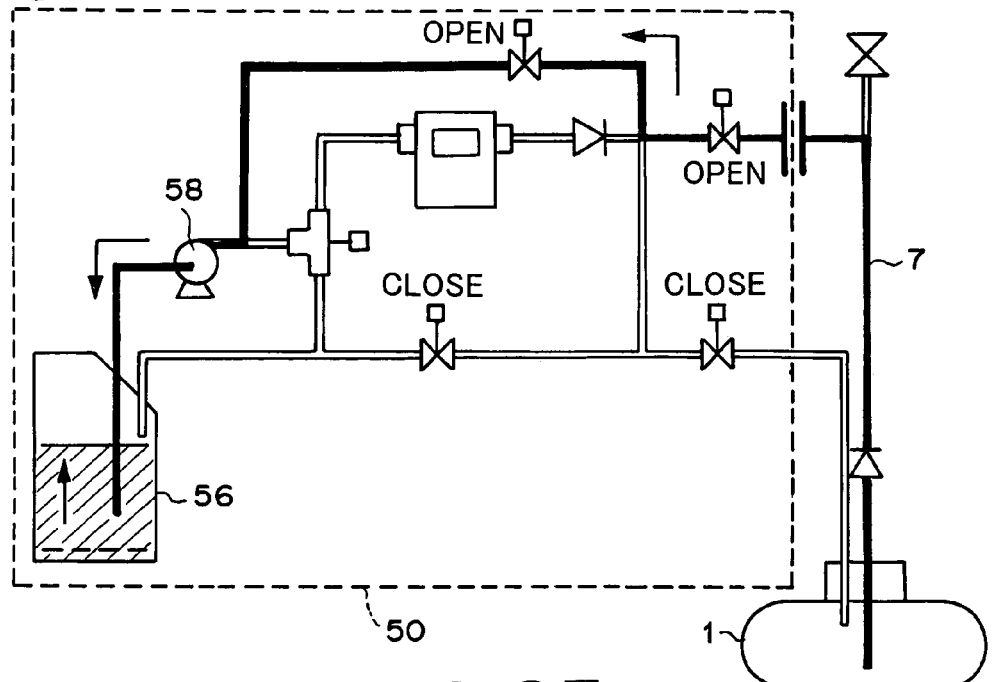
FIG. 24 is an explanatory view of an operation of the apparatus of FIG. 23.

FIG. 24 shows a liquid supply operation. Opened/closed states (OPEN/CLOSE) of four electromagnetic valves are set as shown, the pump 58 is operated (backward liquid feeding operation) to thereby transfer the liquid to the tank 56 for temporarily storing the pressurized liquid from the piping to be measured 7 through the connection ends 5, 52 without passing the liquid through the flowmeter 60 and three-way electromagnetic valve, and the liquid for inspecting the leakage is stored in the tank 56 for temporarily storing the pressurized liquid. This liquid transfer path is a first path.

Figure 25:
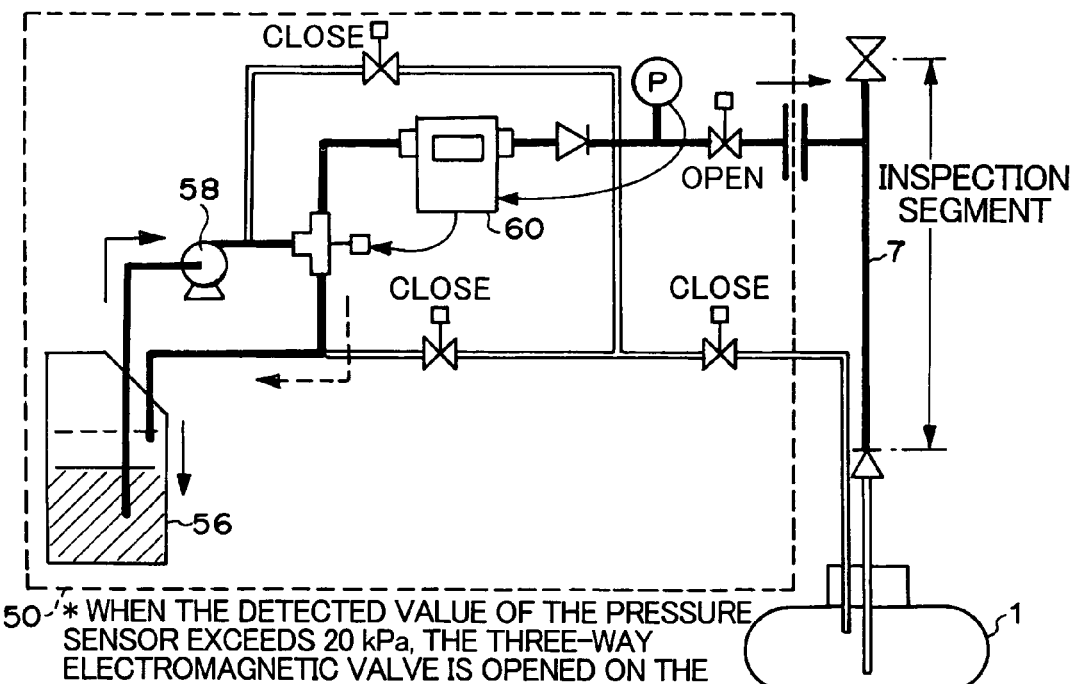
FIG. 25 is an explanatory view of the operation of the apparatus of FIG. 23.

FIG. 25 shows a pressurizing operation at the time of the leakage inspection. The opened/closed states of four electromagnetic valves are set as shown, and the pump 58 is operated (forward liquid feeding operation) to thereby pressure-feed the liquid into the piping to be measured 7 from the tank 56 for temporarily storing the pressurized liquid through the three-way electromagnetic valve, flowmeter 60, and connection ends 52, 5. This liquid transfer path is a second path. When it is detected by the pressure sensor that the liquid pressure of the part of the second path extending to the connection end 52 from the pump 58 exceeds a set value (e.g., 20 kPa), the three-way electromagnetic valve positioned between the pump 58 and the flowmeter 60 is opened on an NC side, and a path (fourth path) for returning the liquid to the tank 56 for temporarily storing the pressurized liquid is formed. This operation of the three-way electromagnetic valve is controlled based on an instruction from a CPU in the flowmeter 60 into which a signal indicating the value over the set pressure value is input from the pressure sensor.

In this inspection, after elapse of some time after starting the liquid pressure feeding by the pump 58, the signal indicating the value over the set pressure value is input into the flowmeter from the pressure sensor, and thereafter the flow rate is measured by the flowmeter. When the flow rate measured in this case exceeds a measurement error, it can be judged that there is a leakage.

Figure 26:
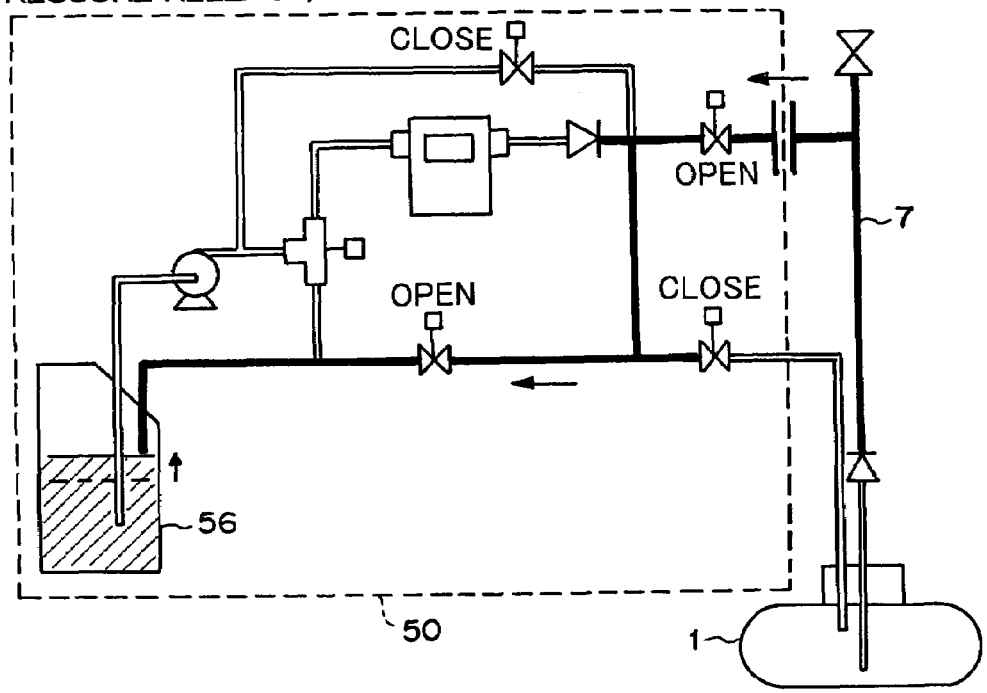
FIG. 26 is an explanatory view of the operation of the apparatus of FIG. 23.

FIG. 26 shows a pressure release operation at the end of the inspection. The operation of the pump 58 is stopped, the opened/closed states of four electromagnetic valves are set as shown, the liquid pressure of at least a part (on the downstream side from the check valve for protecting the flowmeter) of the part of the second path extending to the connection end 52 from the flowmeter 60 is released, and a part of the liquid is returned to the tank 56 for temporarily storing the pressurized liquid. This liquid transfer path is a fifth path.

Figure 27:
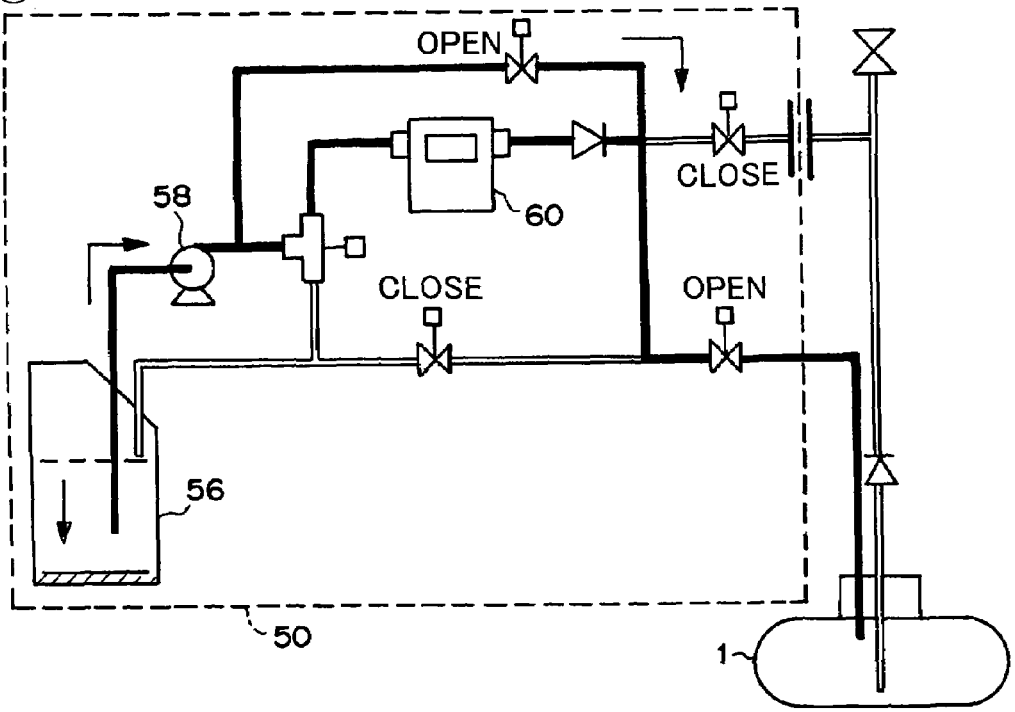
FIG. 27 is an explanatory view of the operation of the apparatus of FIG. 23.

FIG. 27 shows a liquid discharging operation after the end of the inspection. The opened/closed states of four electromagnetic valves are set as shown, the pump 58 is operated (forward liquid feeding operation) to thereby transfer the liquid to the liquid discharge end 54 from the tank 56 for temporarily storing the pressurized liquid through the three-way electromagnetic valve, the flowmeter 60 and further another parallel path, and the liquid is returned into the underground burial tank 1. This liquid transfer path is a third path.

Figure 28:
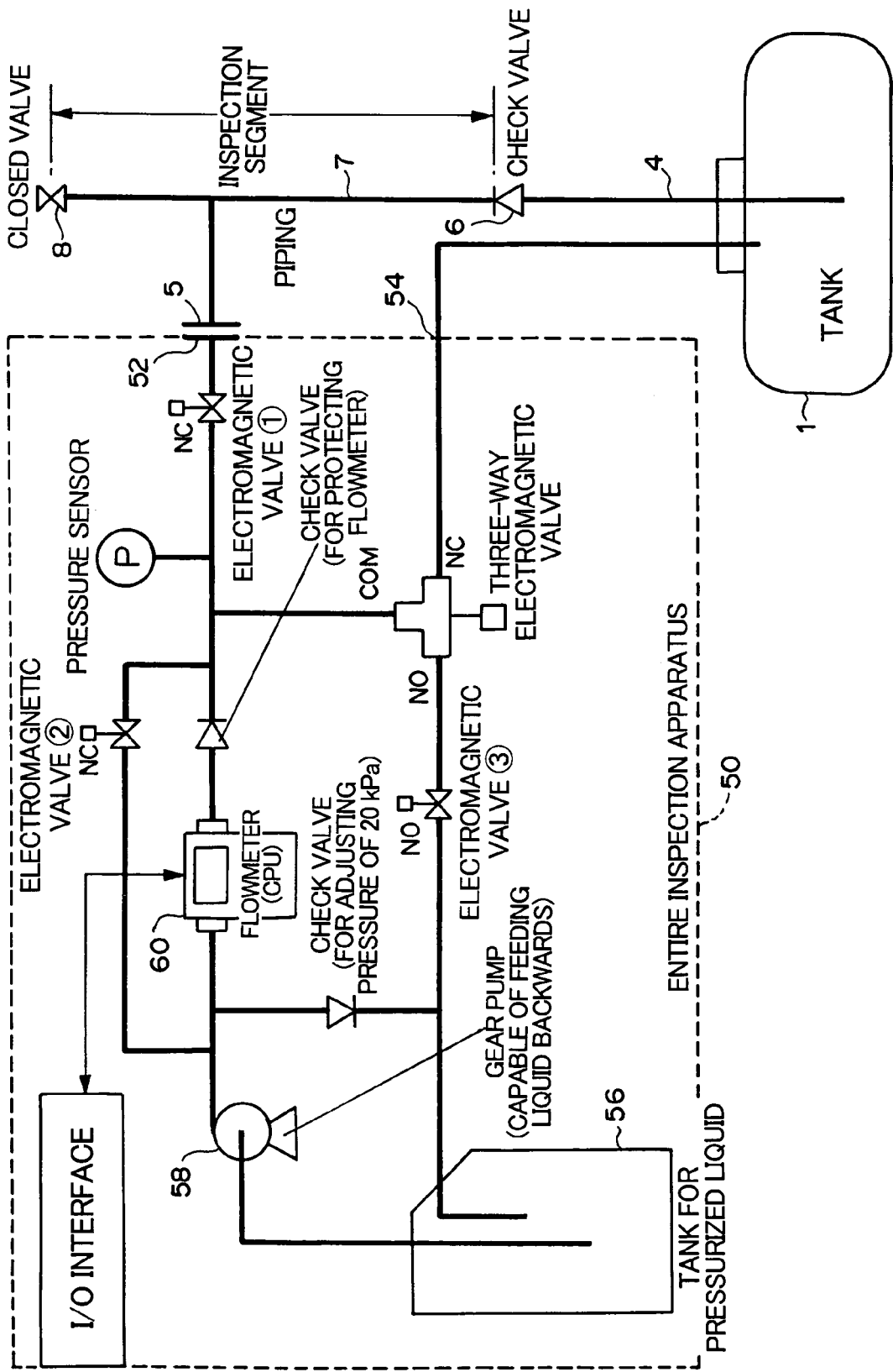
FIG. 28 is a diagram showing one embodiment of the piping leakage inspection apparatus according to the present invention.

FIG. 28 is a diagram showing still another embodiment of the piping leakage inspection apparatus according to the present invention. The present embodiment is different from the embodiment of FIGS. 23 to 27 in that a check valve for adjusting the pressure is used instead of the three-way electromagnetic valve, and the three-way electromagnetic valve is used instead of one electromagnetic valve.

An operation of the leakage inspection apparatus of the present embodiment will be described hereinafter together with the function of the internal piping system with reference to FIGS. 29 to 32. Additionally, here, respects different from those of the embodiment of FIGS. 23 to 27 will be mainly described.

Figure 29:
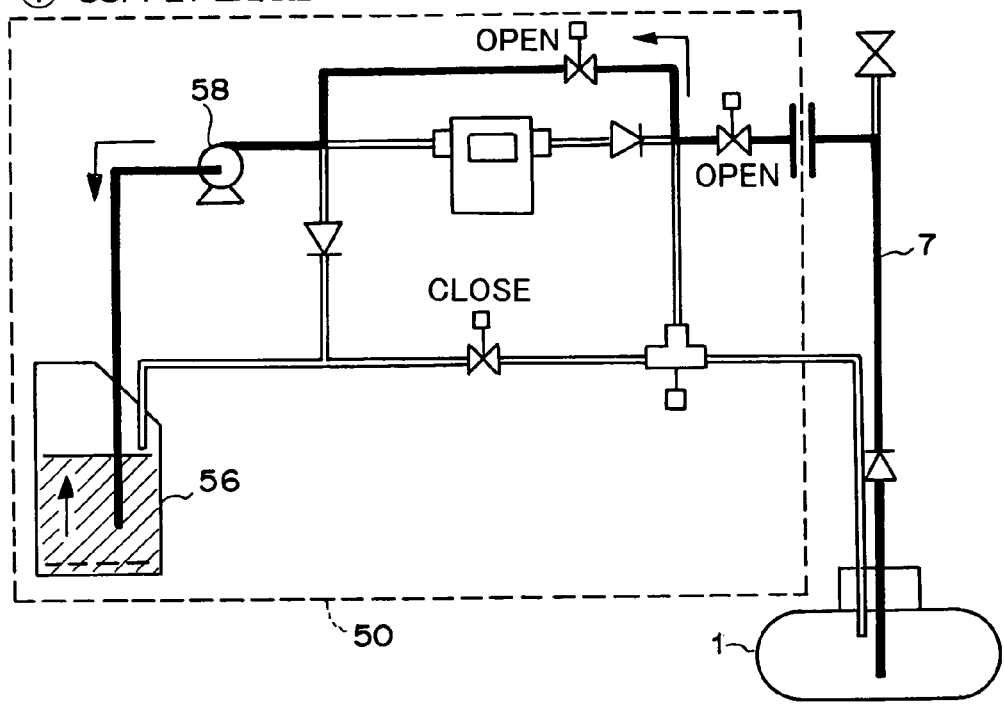
FIG. 29 is an explanatory view of the operation of the apparatus of FIG. 28.

FIG. 29 shows a liquid supply operation. This operation is the same as that described with reference to FIG. 24.

Figure 30:
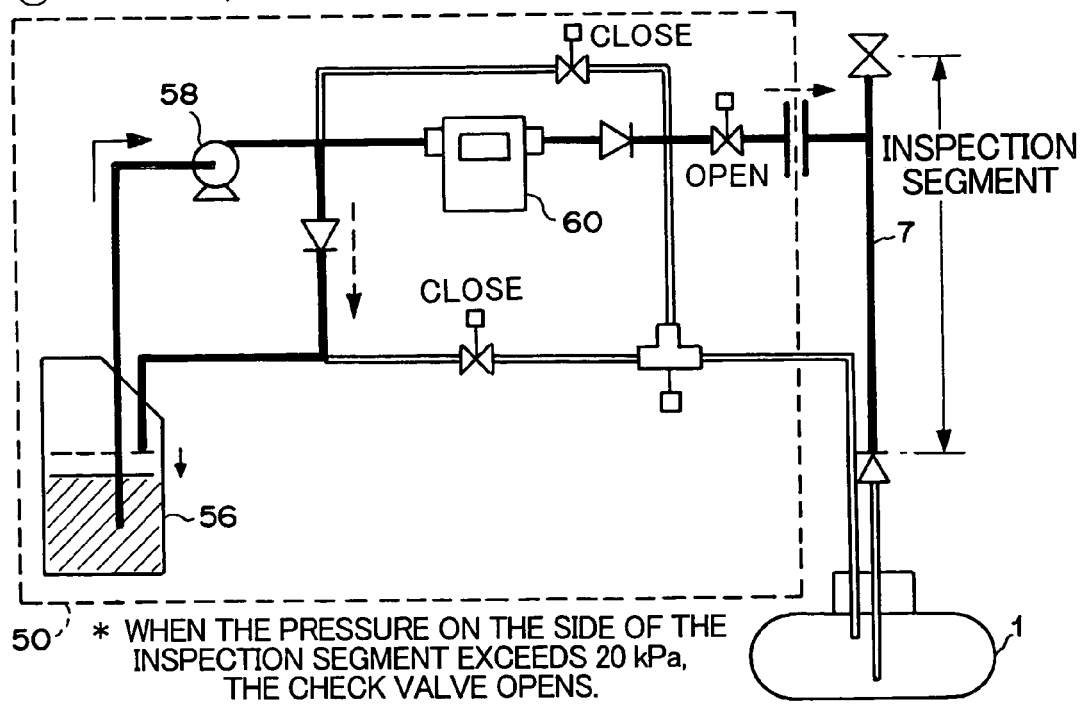
FIG. 30 is an explanatory view of the operation of the apparatus of FIG. 28.

FIG. 30 shows a pressurizing operation at the time of the leakage inspection. This operation is substantially the same as that described with reference to FIG. 25. However, when the liquid pressure of the part of the second path extending to the connection end 52 from the pump 58 exceeds the set value (e.g., 20 kPa) of a check valve for adjusting the pressure, the check valve for adjusting the pressure opens, and a path (fourth path) for returning the liquid into the tank 56 for temporarily storing the pressurized liquid is formed.

Figure 31:
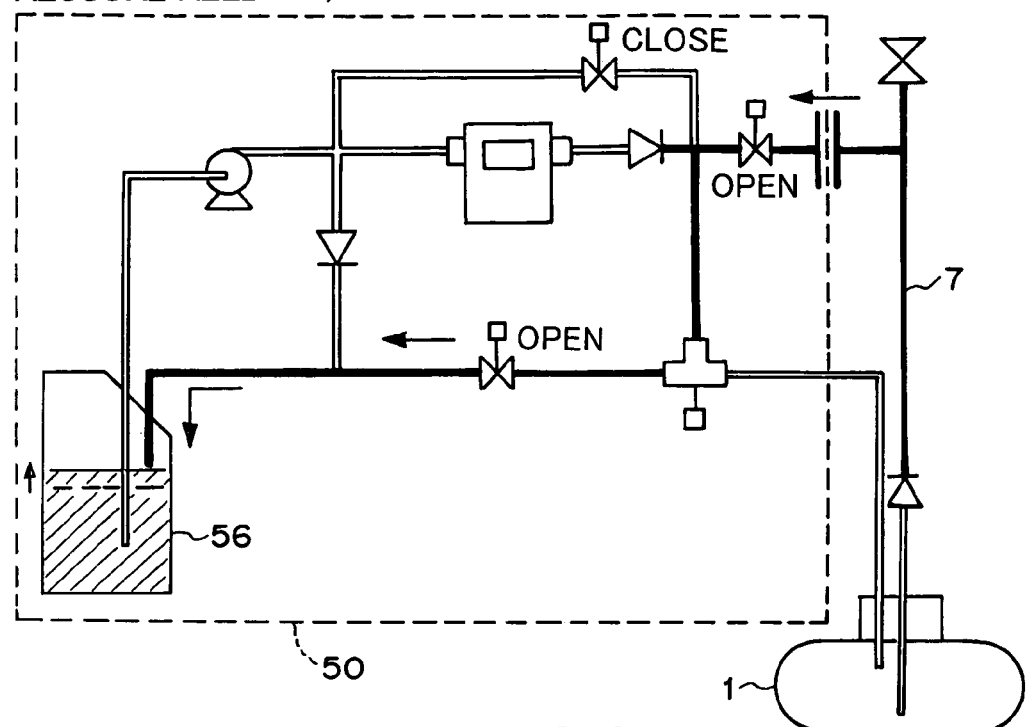
FIG. 31 is an explanatory view of the operation of the apparatus of FIG. 28.

FIG. 31 shows a pressure release operation at the end of the inspection. This operation is the same as that described with reference to FIG. 26.

Figure 32:
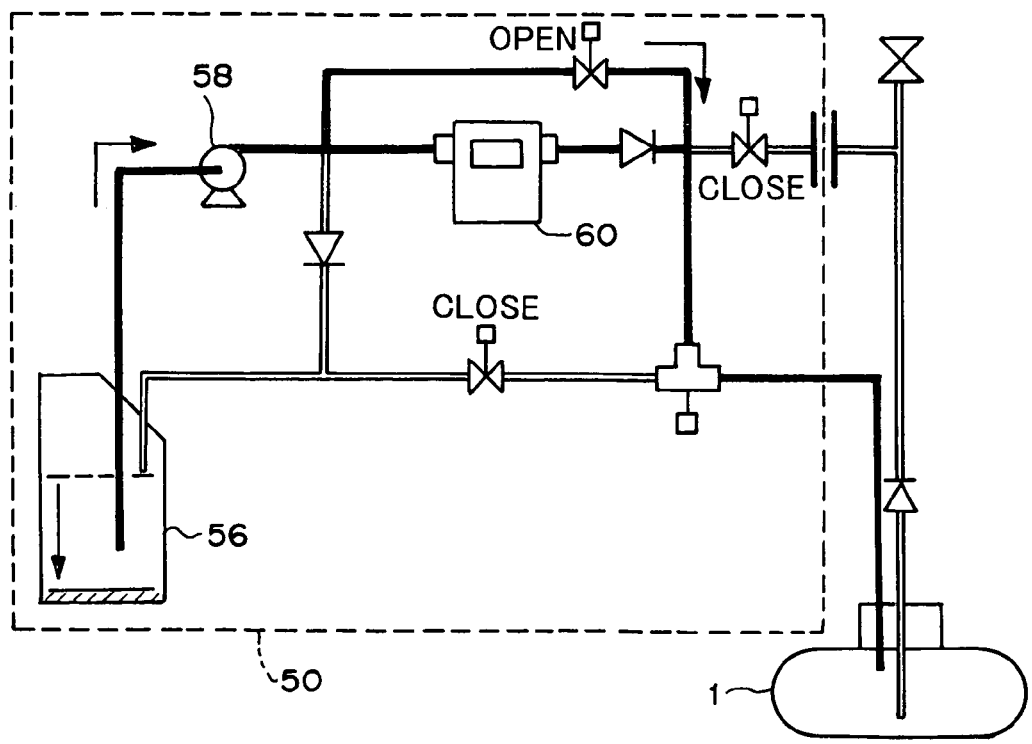
FIG. 32 is an explanatory view of the operation of the apparatus of FIG. 28.

FIG. 32 shows a liquid discharging operation after the end of the inspection. This operation is the same as that described with reference to FIG. 27.

Figure 33:
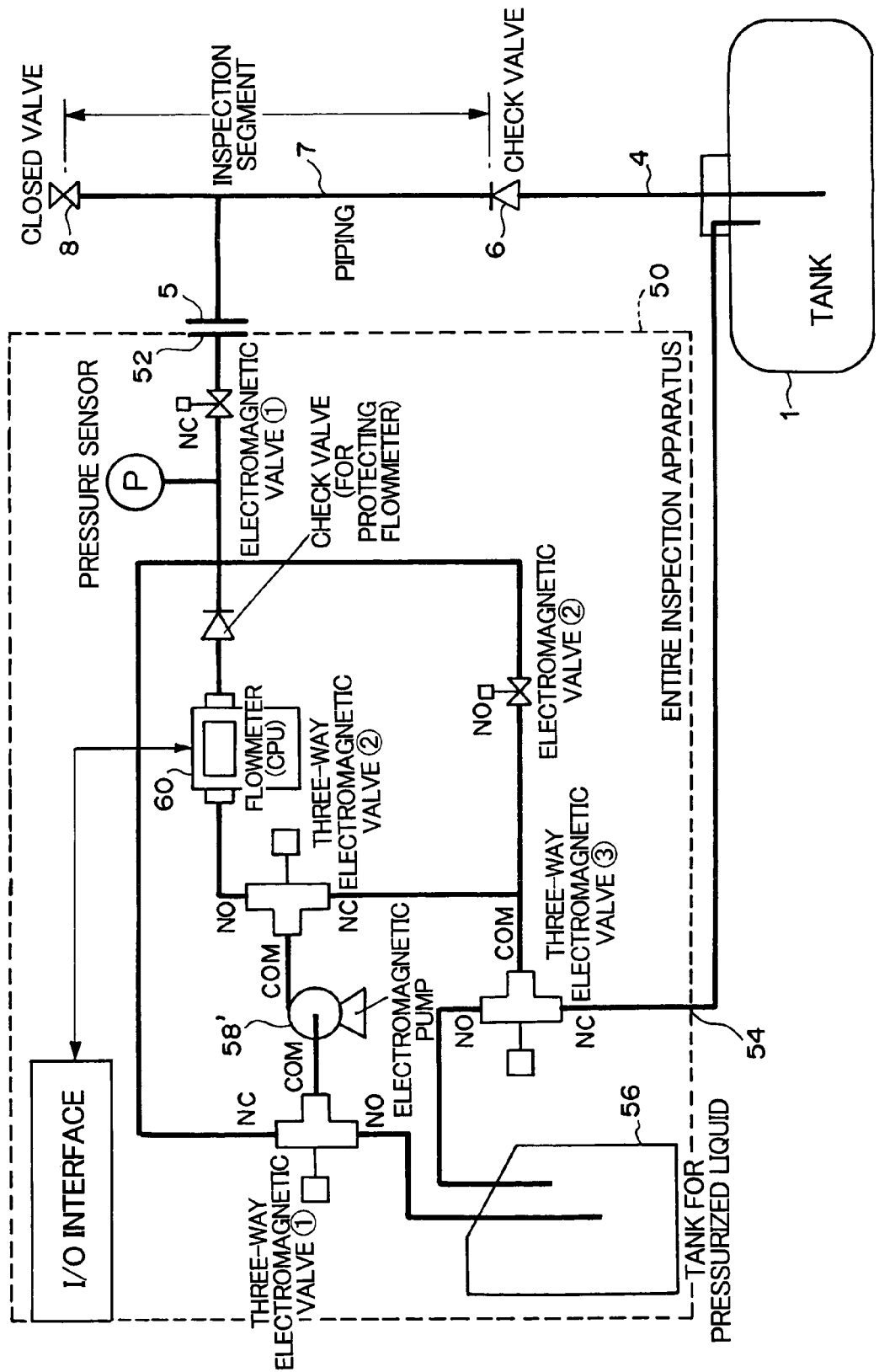
FIG. 33 is a diagram showing one embodiment of the piping leakage inspection apparatus according to the present invention.

FIG. 33 is a diagram showing still another embodiment of the piping leakage inspection apparatus according to the present invention. In the present embodiment, an electromagnetic pump incapable of feeding the liquid backwards is used as a pump 58', and two electromagnetic valves and three three-way electromagnetic valves are used in the internal piping system.

An operation of the leakage inspection apparatus of the present embodiment will be described hereinafter together with the function of the internal piping system with reference to FIGS. 34 to 37. Additionally, here, respects different from those of the embodiment of FIGS. 23 to 27 will be mainly described.

Figure 34:
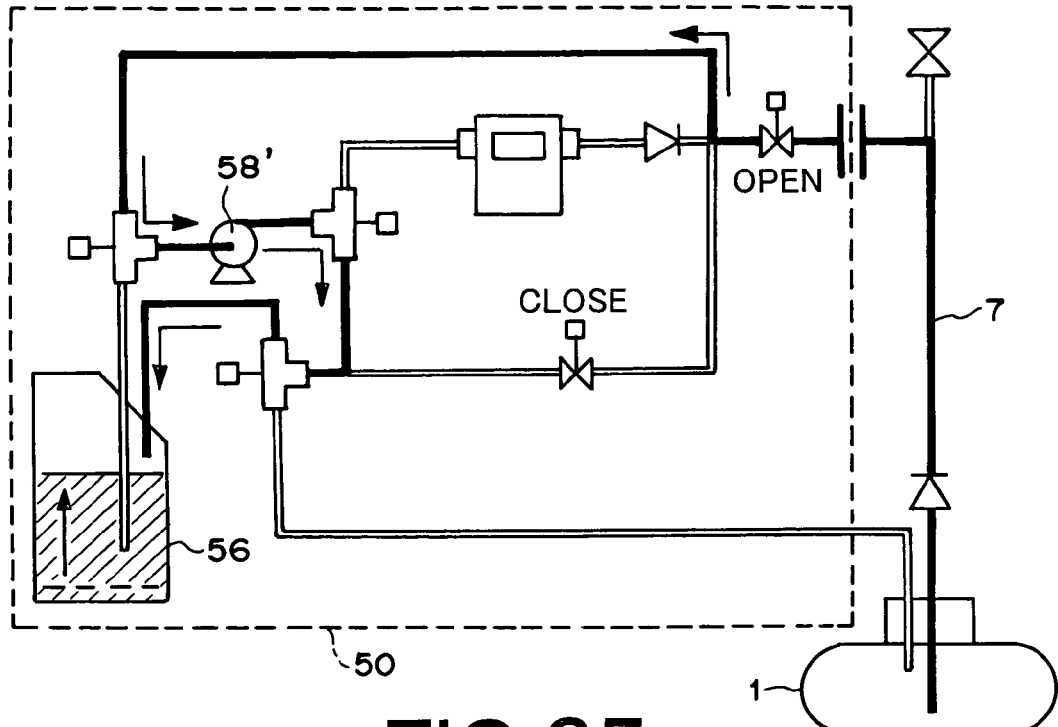
FIG. 34 is an explanatory view of the operation of the apparatus of FIG. 33.

FIG. 34 shows a liquid supply operation. A first path is formed through three three-way electromagnetic valves.

Figure 35:
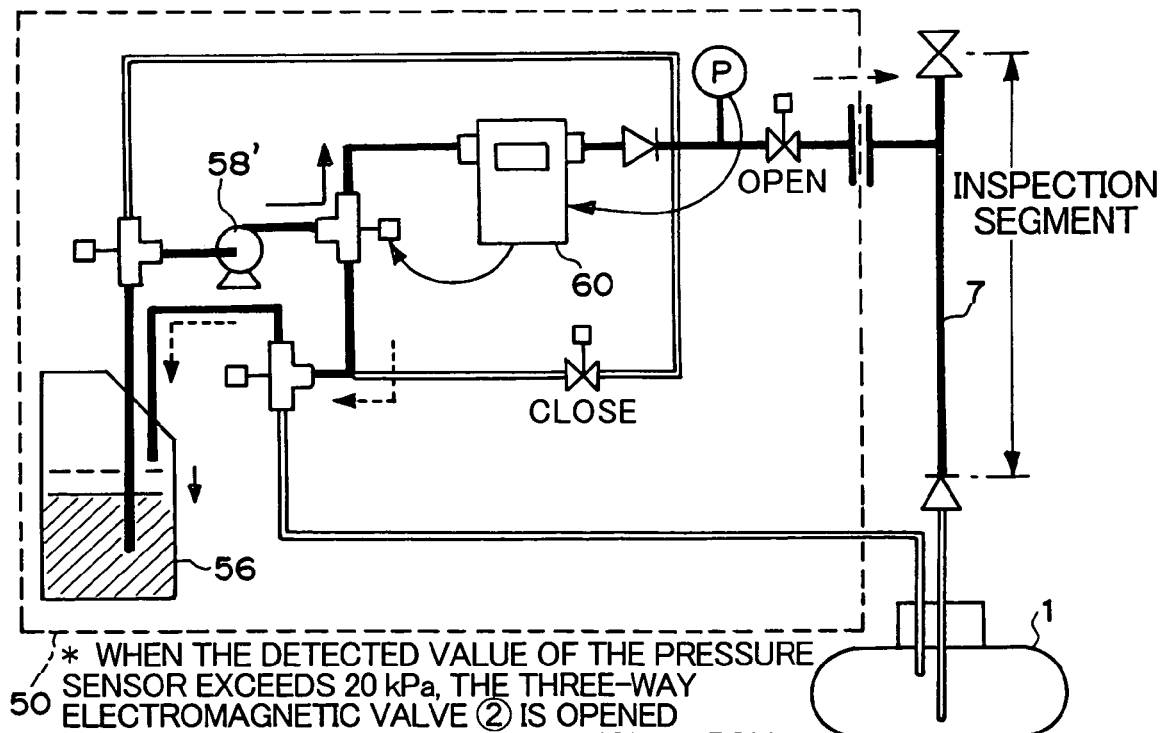
FIG. 35 is an explanatory view of the operation of the apparatus of FIG. 33.

FIG. 35 shows a pressurizing operation at the time of the leakage inspection. A second path is formed through two three-way electromagnetic valves, and a fourth path is formed through one three-way electromagnetic valve.

Figure 36:
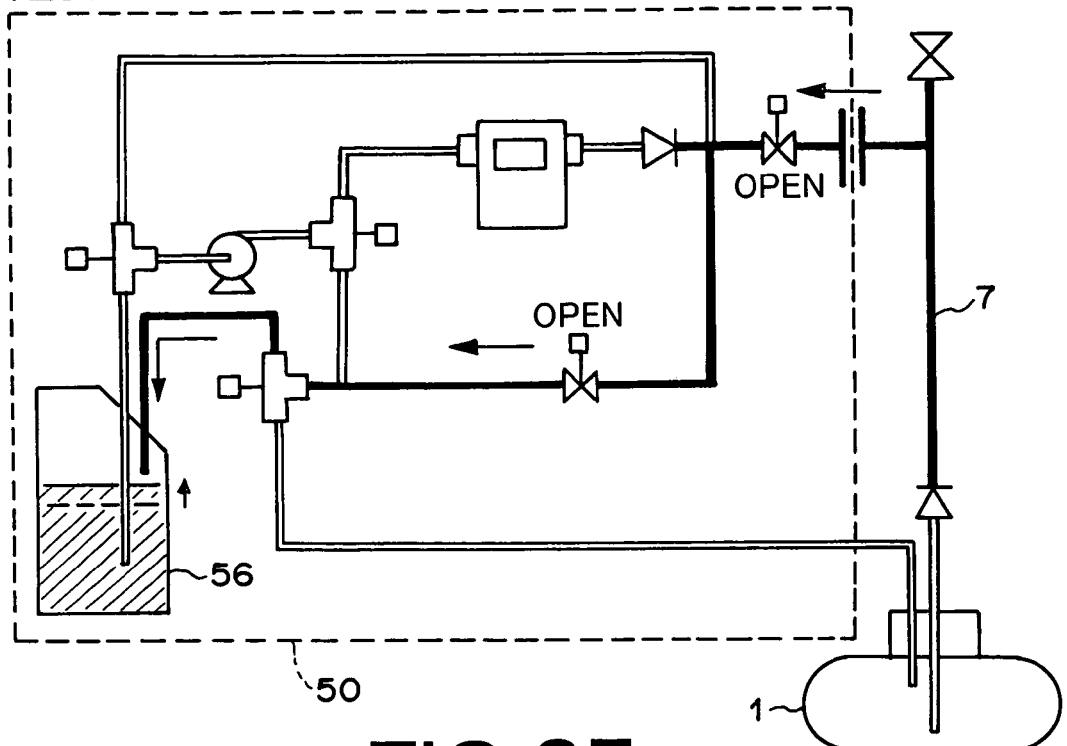
FIG. 36 is an explanatory view of the operation of the apparatus of FIG. 33.

FIG. 36 shows a pressure release operation at the end of the inspection. A fifth path is formed through one three-way electromagnetic valve.

Figure 37:
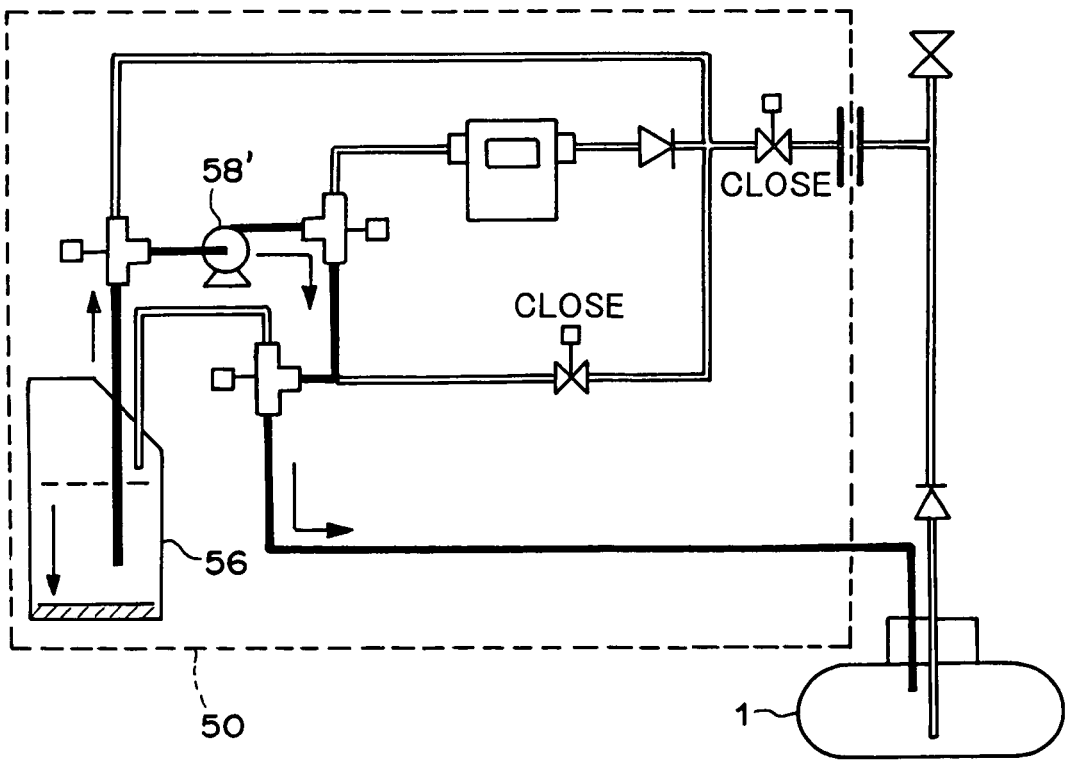
FIG. 37 is an explanatory view of the operation of the apparatus of FIG. 33.

FIG. 37 shows a liquid discharging operation after the end of the inspection. A third path is formed through three three-way electromagnetic valves without passing through the flowmeter 60.

Figure 38:
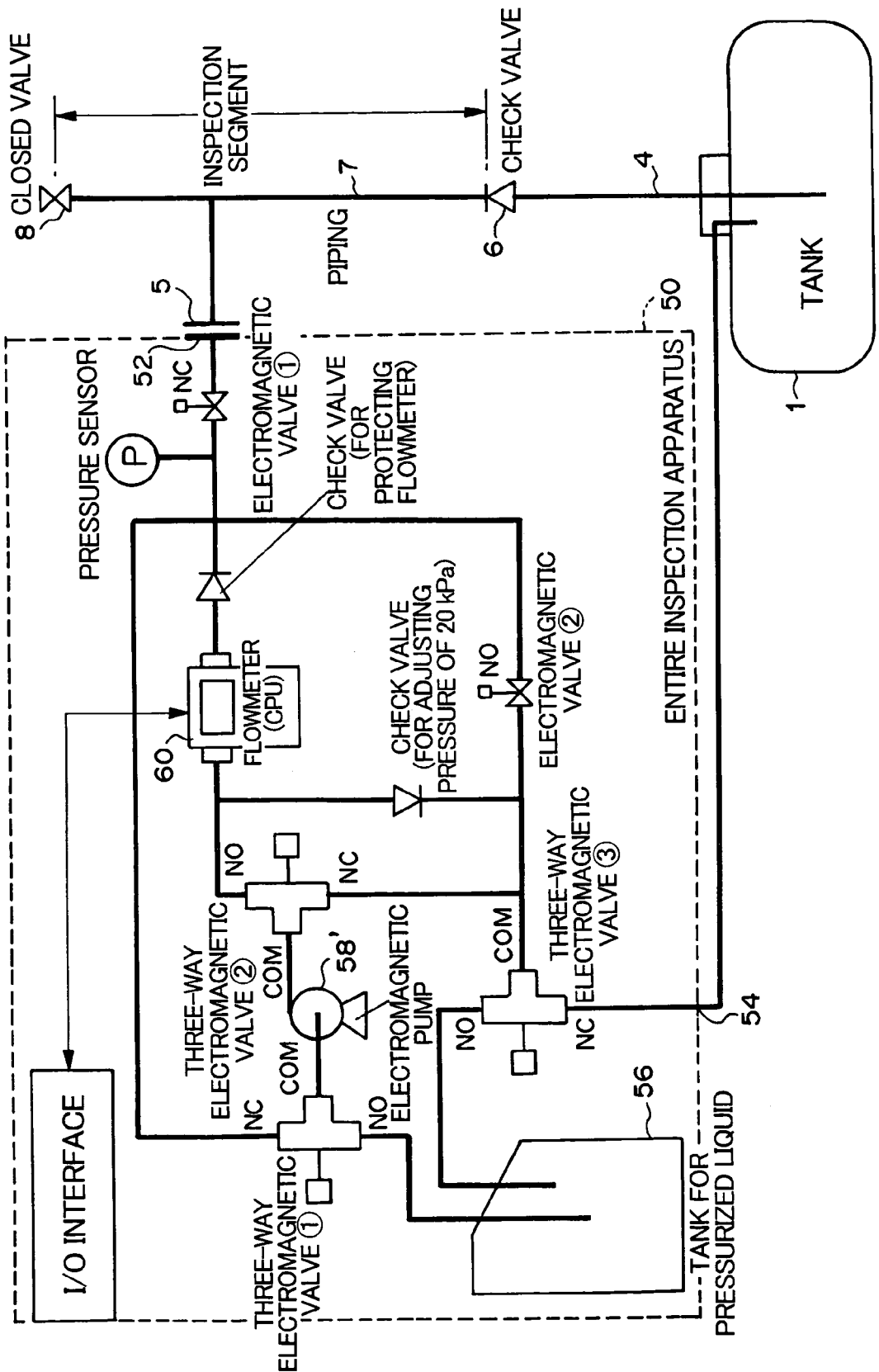
FIG. 38 is a diagram showing one embodiment of the piping leakage inspection apparatus according to the present invention.

FIG. 38 is a diagram showing still another embodiment of the piping leakage inspection apparatus according to the present invention. The present embodiment is different from the embodiment of FIGS. 33 to 37 in that a check valve for adjusting the pressure is added.

An operation of the leakage inspection apparatus of the present embodiment will be described hereinafter together with the function of the internal piping system with reference to FIGS. 39 to 42. Additionally, here, respects different from those of the embodiment of FIGS. 33 to 37 will be mainly described.

Figure 39:
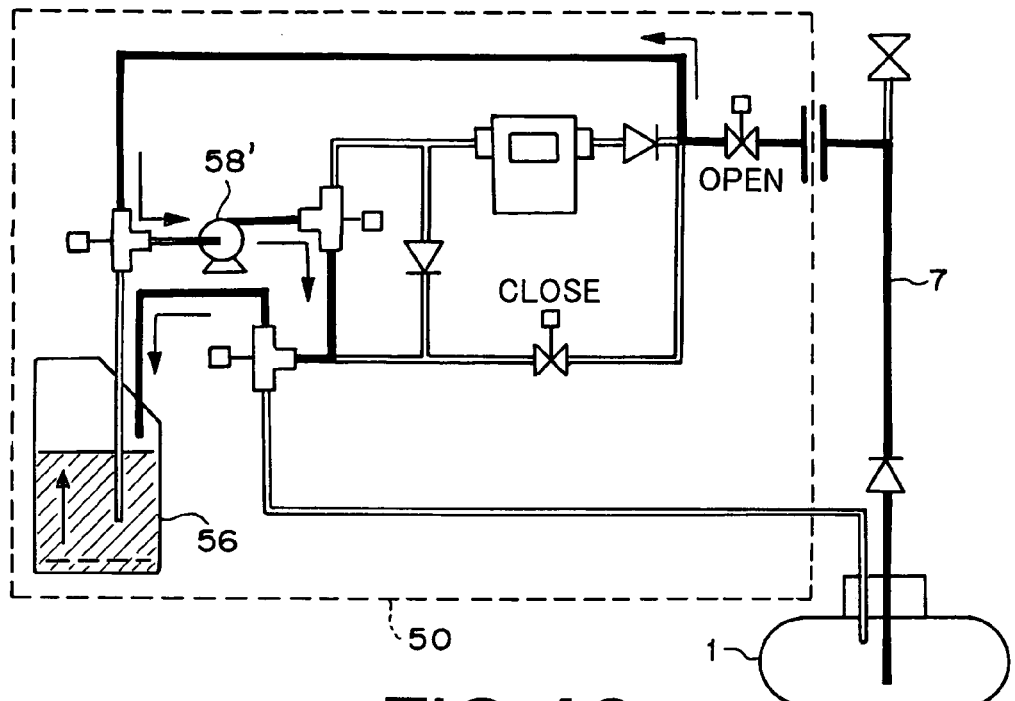
FIG. 39 is an explanatory view of the operation of the apparatus of FIG. 38.

FIG. 39 shows a liquid supply operation. This operation is the same as that described with reference to FIG. 34.

Figure 40:
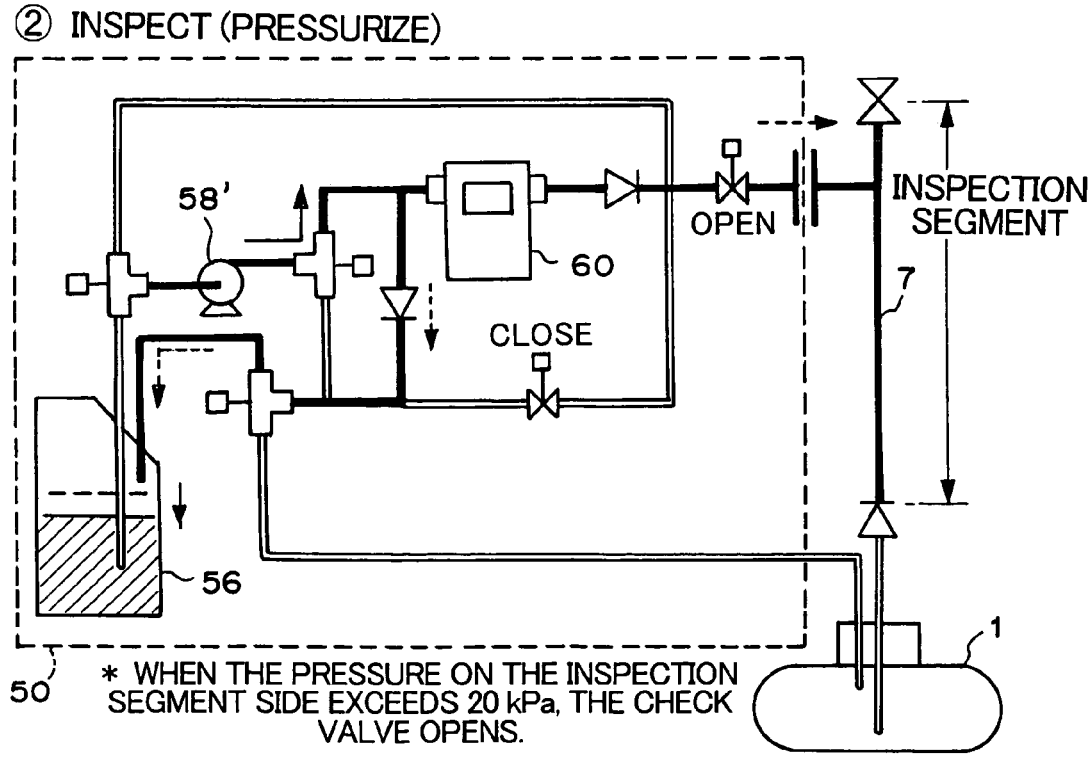
FIG. 40 is an explanatory view of the operation of the apparatus of FIG. 38.

FIG. 40 shows a pressurizing operation at the time of the leakage inspection. A second path is the same as that of FIG. 35, but a fourth path is formed through the check valve for adjusting the pressure.

Figure 41:
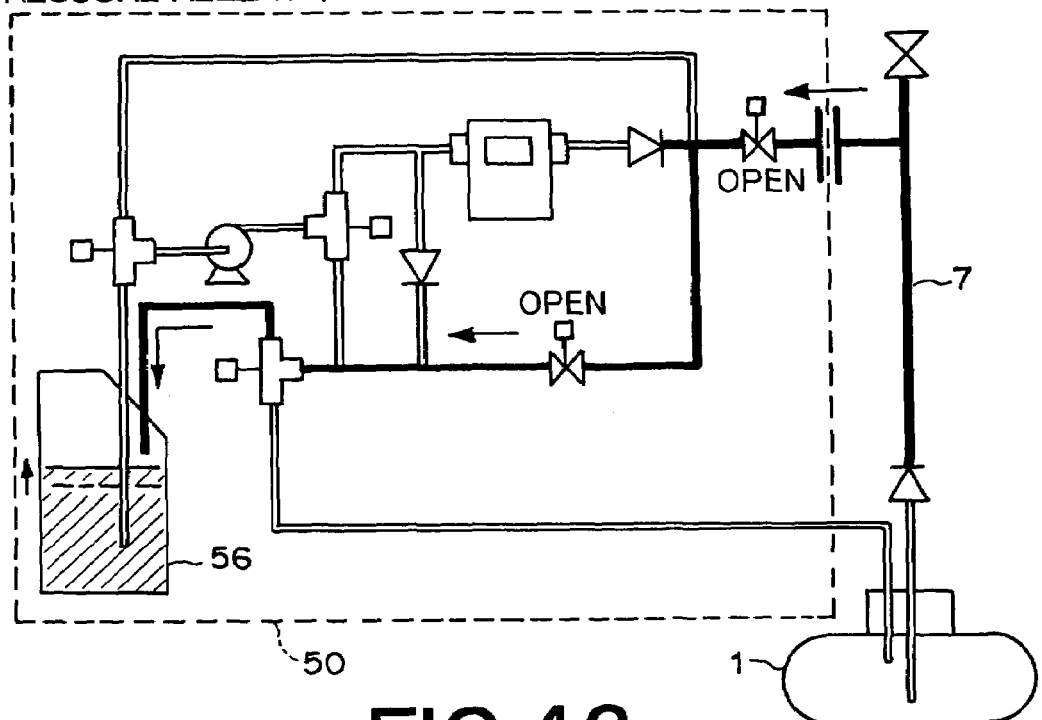
FIG. 41 is an explanatory view of the operation of the apparatus of FIG. 38.

FIG. 41 shows a pressure release operation at the end of the inspection. This operation is the same as that described with reference to FIG. 36.

Figure 42:
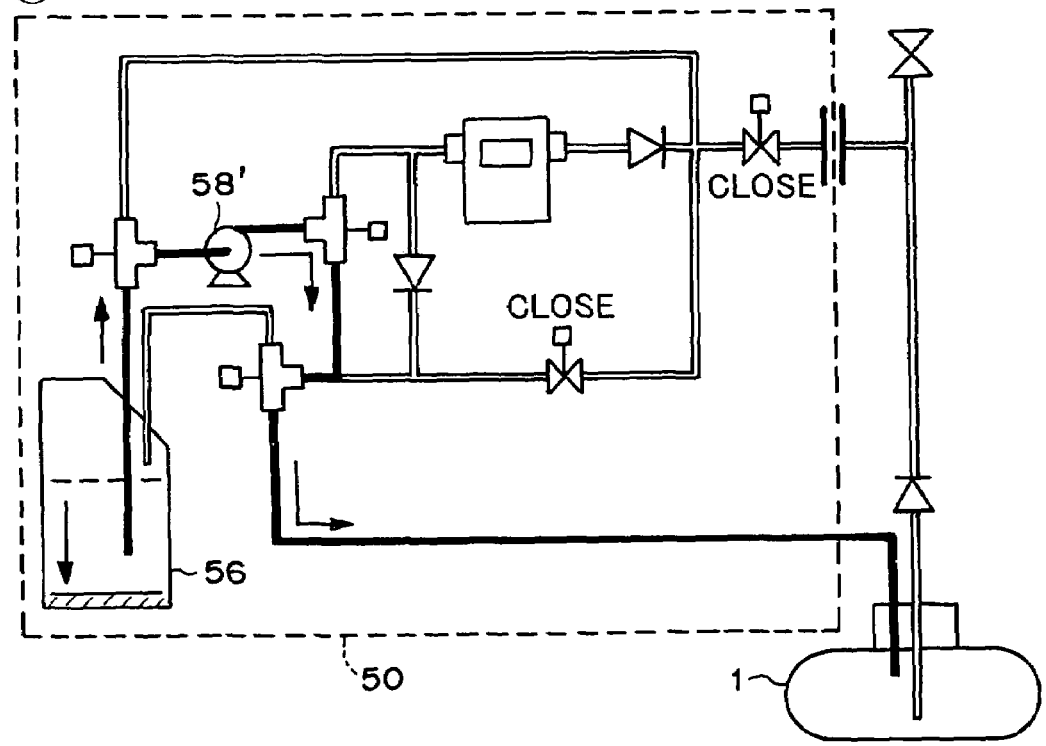
FIG. 42 is an explanatory view of the operation of the apparatus of FIG. 38.

FIG. 42 shows a liquid discharging operation after the end of the inspection. This operation is the same as that described with reference to FIG. 37.

According to the leakage inspection apparatus of the above-described embodiments of the present invention, the inspection apparatus itself takes the liquid transferred in the piping to be measured, and performs the pressurizing inspection using the liquid as the pressurized liquid. Therefore, an operation of extracting the liquid from the piping to be measured before the inspection, storing the liquid in another place, and returning the liquid after the inspection, or an operation for introducing a gas or a liquid for the inspection is not required, and an inspection operation is remarkably alleviated. Since the inspection apparatus can be constantly connected to the connection end of the piping to be measured, continuous inspection is easy, and early finding of the leakage is possible.

The flowmeter 60 is not especially limited, but a flowmeter capable of measuring a micro amount is preferable. As the flowmeter capable of correctly measuring a trace flow rate to a comparatively large flow rate, a flowmeter similar to that described with reference to FIGS. 1 to 9 is illustrated.

Figure 43:
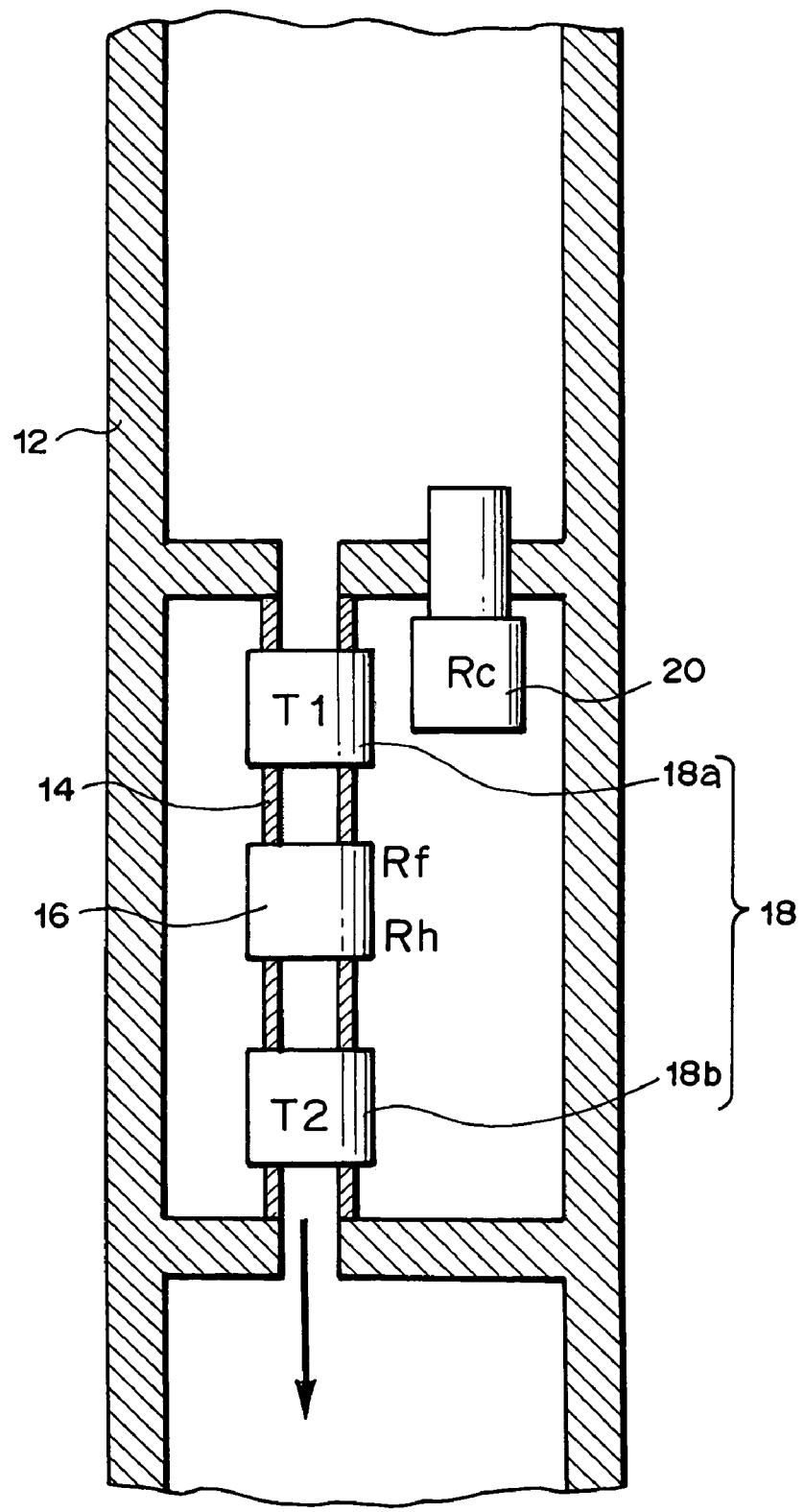
FIG. 43 is a schematic sectional view showing one embodiment of a flowmeter for use in the piping leakage inspection apparatus according to the present invention.

FIG. 43 is a schematic sectional view showing one embodiment of a flowmeter 60. Since the flowmeter 60 is structurally similar to that of FIG. 1, the description with reference to FIGS. 1 to 8 applies as such.

As shown in FIG. 43, a fine measuring tube 14 is disposed in a cylindrical measuring tube 12, and a liquid (fluid) flows in the fine measuring tube 14. In the present embodiment, the fine measuring tube 14 is used as a fluid channel constituting an internal piping system. When leakage of the liquid from the piping to be measured 7 is generated, a predetermined pressurized state is realized at the time of leakage inspection, and thereafter the liquid passes in a direction of an arrow in the fine measuring tube 14.

The flow rate is measured in the same manner as described with reference to FIGS. 1 to 8. Based on the flow rate measurement output from the computing section 34 as the result of the flow rate measurement, the leakage detection is performed in such a manner that it is judged there is a leakage of the liquid in the piping to be measured in a case where the flow rate measurement exceeds a measurement error. This leakage detection is preferably performed, for example, under conditions that any liquid is not replenished into the tank or any liquid is not pumped out of the tank at nighttime or the like. FIG. 44 shows one embodiment of a liquid leakage monitoring system utilizing the above-described leakage detection of the piping, and further including the leakage detection of the underground tank.

FIG. 44 shows a state in which a tank leakage detection device (tank leakage inspection device) 112 is inserted downwards into a in-tank liquid 2 from a measuring port of an underground tank. In the tank leakage detection device, the flowmeter is usable as described above. On the other hand, a piping leakage detection device (piping leakage inspection device) 50 is disposed which detects the leakage of the liquid from the piping to be measured 7.

The tank leakage detection device and piping leakage detection device are connected to individual monitoring apparatuses installed for each tank in such a manner that signals can be transmitted/received by internal communication means via cable or radio. The connection is made via an I/O interface disposed in the piping leakage detection apparatus or the like, for example, as shown in FIG. 23. The individual monitoring device periodically (e.g., once a day) inquires the tank leakage detection apparatus and the piping leakage detection apparatus, respectively, of results (presence of leakage, a degree [flow rate] of the leakage, etc.) of the detection (inspection). The leakage data obtained from the leakage detection device is stored in the memory of the individual monitoring apparatus. The data stored in the memory is constituted of a part indicating the tank leakage detection result, and a part indicating a piping leakage detection result. The description with reference to FIG. 9 applies to the apparatus of FIG. 44.

INDUSTRIAL APPLICABILITY

As described above, according to the present invention, there are provided a flow rate measuring method and a flowmeter, capable of measuring a flow rate over a broad flow rate range from a trace flow rate region to a comparatively large flow rate region with satisfactory precision and sensitivity. According to the present invention, there are provided a flow rate measuring method and a flowmeter, in which a danger of fire by ignition is sufficiently reduced even in a case where fluids are inflammable liquids such as fuel oils. Therefore, it is possible to easily, correctly, and safely detect even a trace amount of fluid using the flow rate measuring method and flowmeter of the present embodiment.

Moreover, as described above, according to the present invention, there are provided a flow rate measuring section package and a flow rate measuring unit preferably for use in a flowmeter which is capable of measuring a flow rate over a broad flow rate range from a trace flow rate region to a comparatively large flow rate region with satisfactory precision and sensitivity and in which a danger of fire by ignition is sufficiently reduced even in a case where fluids are inflammable liquids such as fuel oils and which is capable of easily, correctly, and safely detecting even a trace amount of fluid leakage.

Furthermore, as described above, according to the present invention, there is provided a piping leakage inspection apparatus capable of easily and correctly detecting even a trace amount of leakage. According to the present invention, there is provided a leakage inspection apparatus capable of easily and efficiently performing leakage inspection utilizing a liquid which has been transferred into a piping and which is left in the piping as a pressurized liquid.

What is claimed is:

1. A method of measuring a flow rate of a fluid in a fluid flow channel, comprising the steps of: obtaining a flow rate value obtained by measuring a flow rate of the fluid by indirectly-heated constant-temperature controlling flow rate measuring as a measurement with respect to a high flow rate region larger than a boundary flow rate region predetermined concerning a value of the flow rate; obtaining a flow rate value obtained by two-constant-point temperature difference detecting flow rate measuring as a measurement with respect to a low flow rate region smaller than the boundary flow rate region; obtaining a flow rate value obtained by the indirectly-heated constant-temperature controlling flow rate measuring or a flow rate value obtained by the two-constant-point temperature difference detecting flow rate measuring as a measurement with respect to the boundary flow rate region; and using a measuring section for the indirectly-heated constant-temperature controlling flow rate measuring as a heat source which heats the fluid in the fluid flow channel in the two-constant-point temperature difference detecting flow rate measuring.

2. The flow rate measuring method according to claim 1, wherein the boundary flow rate region is constituted of one specific flow rate value only.

3. The flow rate measuring method according to claim 1, further comprising the steps of: first measuring the flow rate of the fluid by the indirectly-heated constant-temperature controlling flow rate measuring; obtaining the flow rate value as the measurement, when the obtained flow rate value belongs to the high flow rate region or one of the high flow rate region and the boundary flow rate region; in another case, next measuring the flow rate of the fluid by the two-constant-point temperature difference detecting flow rate measuring; and obtaining the obtained flow rate value as the measurement.

4. The flow rate measuring method according to claim 1, further comprising the steps of: first measuring the flow rate of the fluid by the two-constant-point temperature difference detecting flow rate measuring; obtaining the flow rate value as the measurement, when the obtained flow rate value belongs to the low flow rate region or one of the low flow rate region and the boundary flow rate region; in another case, next measuring the flow rate of the fluid by the indirectly-heated constant-temperature controlling flow rate measuring; and obtaining the obtained flow rate value as the measurement.

5. A flow rate measuring unit, comprising: the flow rate measuring section package according to claim 1; a unit substrate for attaching the flow rate measuring section package; and a flow rate measuring circuit element attached to the unit substrate.

6. The flow rate measuring unit according to claim 5, wherein the flow rate measuring circuit element includes an analog circuit element.

7. The flow rate measuring unit according to claim 6, wherein the analog circuit element feedback-controls the heating element based on a detected temperature of the first temperature detecting element, obtains a first flow rate corresponding output based on a state of the feedback control, and obtains a second flow rate corresponding output based on a difference between detected temperatures of the second and third temperature detecting elements.

8. The flow rate measuring unit according to claim 7, wherein the flow rate measuring circuit element further includes a digital circuit element.

9. The flow rate measuring unit according to claim 8, wherein the digital circuit element comprises a computing section which obtains a flow rate measurement based on the first and second flow rate corresponding outputs, and the computing section outputs a flow rate value obtained based on the first flow rate corresponding output as the measurement with respect to a high flow rate region larger than a boundary flow rate region predetermined concerning the value of the flow rate, outputs a flow rate value obtained based on the second flow rate corresponding output as the measurement with respect to a low flow rate region smaller than the boundary flow rate region, and outputs a flow rate value obtained based on the first or second flow rate corresponding output as the measurement with respect to the boundary flow rate region.

10. The flow rate measuring unit according to claim 9, wherein the boundary flow rate region is constituted of one specific flow rate value only.

11. The flow rate measuring unit according to claim 9, wherein the computing section first outputs the flow rate value obtained based on the first flow rate corresponding output as the measurement, when the first flow rate corresponding output corresponds to the high flow rate region or one of the high flow rate region and the boundary flow rate region, and, in another case, outputs the flow rate value obtained based on the second flow rate corresponding output as the measurement.

12. The flow rate measuring unit according to claim 9, wherein the computing section first outputs the flow rate value obtained based on the second flow rate corresponding output as the measurement, when the second flow rate corresponding output corresponds to the low flow rate region or one of the low flow rate region and the boundary flow rate region, and, in another case, outputs the flow rate value obtained based on the first flow rate corresponding output as the measurement.

* * * * *